(12) United States Patent
Wang et al.

(10) Patent No.: US 12,328,658 B2
(45) Date of Patent: Jun. 10, 2025

(54) COMMUNICATION METHOD, APPARATUS, DEVICE, AND SYSTEM

(71) Applicant: HUAWEI TECHNOLOGIES CO., LTD., Shenzhen (CN)

(72) Inventors: Jun Wang, Shanghai (CN); Yulong Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 400 days.

(21) Appl. No.: 17/989,896

(22) Filed: Nov. 18, 2022

(65) Prior Publication Data

US 2023/0078904 A1 Mar. 16, 2023

Related U.S. Application Data

(63) Continuation of application No. PCT/CN2021/073900, filed on Jan. 27, 2021.

(30) Foreign Application Priority Data

May 22, 2020 (CN) .......................... 202010444348.5

(51) Int. Cl.
*H04W 40/24* (2009.01)
*H04L 45/02* (2022.01)
*H04L 45/44* (2022.01)
*H04W 40/28* (2009.01)

(52) U.S. Cl.
CPC .......... *H04W 40/246* (2013.01); *H04L 45/02* (2013.01); *H04L 45/44* (2013.01); *H04W 40/28* (2013.01)

(58) Field of Classification Search
None
See application file for complete search history.

(56) References Cited

U.S. PATENT DOCUMENTS

| 10,602,424 | B2 | 3/2020 | Perdomo |
| 11,284,327 | B2 * | 3/2022 | Cho ....................... H04W 84/18 |
| 11,751,100 | B2 * | 9/2023 | Mao ..................... H04W 28/086 |
| | | | 370/329 |

(Continued)

FOREIGN PATENT DOCUMENTS

| CN | 105704031 A | 6/2016 |
| CN | 110036606 A | 7/2019 |
| CN | 110312209 A | 10/2019 |

(Continued)

OTHER PUBLICATIONS

InterDigital Inc., Solution for Key Issue #4 Support of UE-to-UE Relay. SA WG2 Meeting #136AH, Jan. 13-17, 2020, Incheon, Korea, S2-2001488, 4 pages.

(Continued)

*Primary Examiner* — Brian S Roberts
(74) *Attorney, Agent, or Firm* — HAUPTMAN HAM, LLP

(57) ABSTRACT

A communication method includes receiving a first packet from a second node, where the first packet includes an identifier of the second node, a first identifier, and an identifier of a receiving node; determining, based on the first packet, whether the first node is the receiving node; and determining a first routing table based on the first packet in response to a determination being made that the first node is not the receiving node, where the first routing table is used for data routing to the receiving node.

20 Claims, 16 Drawing Sheets

(56) References Cited

U.S. PATENT DOCUMENTS

2021/0045168 A1\* 2/2021 Cho .................. H04W 40/22
2022/0286938 A1\* 9/2022 Wang ................. H04W 40/34

FOREIGN PATENT DOCUMENTS

| CN | 110622563 A | 12/2019 |
|---|---|---|
| EP | 3618391 A1 | 3/2020 |
| WO | 2018019056 A1 | 2/2018 |
| WO | 2019242683 A1 | 12/2019 |

OTHER PUBLICATIONS

International Search Report issued in corresponding International Application No. PCT/CN2021/073900, dated Apr. 16, 2021, pp. 1-10.
Extended European Search Report issued in corresponding European Application No. 21809520.6, dated Sep. 13, 2023, pp. 1-14.

\* cited by examiner

COMMUNICATION METHOD, APPARATUS, DEVICE, AND SYSTEM

CROSS-REFERENCE TO RELATED APPLICATIONS

This application is a continuation of International Application No. PCT/CN2021/073900, filed on Jan. 27, 2021, which claims priority to Chinese Patent Application No. 202010444348.5, filed on May 22, 2020. The disclosures of the aforementioned applications incorporated herein in entirety by reference.

BACKGROUND

In a wireless communication system, data communication is performed between user equipment (UEs) through a network, or communication between the UEs are directly performed without using a network device. A link for the direct communication between the UEs are referred to as a sidelink (SL). Similar to a Uu interface for communication between the UE and a base station, an interface for SL communication is referred to as a PC5 interface. A typical application scenario of the SL communication is vehicle to everything (V2X). In V2X, each vehicle is considered as UE, and data transmission is directly performed between UEs through an SL, so that a network does not call to be used. In this way, a communication delay is effectively reduced.

In response to communication being performed between the UEs through the SL, a communication distance is unable to be very long due to a limited hardware capability of data sending UE, external environment interference, or the like. As a result, a scenario in which communication is performed between the UEs through the SL is limited.

SUMMARY

In view of this, embodiments provide a communication method, an apparatus, a communication device, and a system.

Some embodiments provide a communication method. The method is performed by a first node and includes: receiving a first packet from a second node, where the first packet includes an identifier of the second node, a first identifier, and an identifier of a receiving node; determining, based on the first packet, whether the first node is the receiving node; and in response to a determination being made that the first node is the receiving node and the first identifier is a destination broadcast identifier, sending a second packet to the second node, where the second packet includes the identifier of the receiving node and an identifier of the first node; or determining a first routing table based on the first packet in response to a determination being made that the first node is not the receiving node, where the first routing table is used for data routing to the receiving node.

According to this method, an example beneficial effect includes: In response to SL communication being unable to be implemented between UEs due to a hardware capability, a distance, external interference, or the like, a UE-to-UE forwarding system is introduced, that is, at least one forwarding UE is added between sending UE and receiving UE, to implement communication between the sending UE and the receiving UE. Further, a routing table for data transmission between the sending UE and forwarding UE, between forwarding UEs, and between the forwarding UE and the receiving UE is constructed to ensure working of the UE-to-UE forwarding system.

In some embodiments, the determining a first routing table based on the first packet in response to a determination being made that the first node is not the receiving node includes: determining the first routing table based on a routing table that is on the first node and that is for data routing with the receiving node.

According to this method, an example beneficial effect includes: In response to determining that a forwarding node is not the final receiving node, the forwarding node queries, based on the identifier of the receiving node in the received packet, whether the forwarding node stores a routing table that is used for data routing with the receiving node. in response to the forwarding node storing the routing table that is used for data routing with the receiving node, the forwarding node does not call to further send a packet to construct the routing table that is used for data routing with the receiving node.

In some embodiments, the determining a first routing table based on the first packet in response to a determination being made that the first node is not the receiving node includes: sending a third packet to another node in a multicast and/or broadcast manner, where the third packet includes the identifier of the receiving node; receiving a fourth packet from a fourth node, where the fourth packet includes an identifier of the fourth node and an identifier of the first node, and a routing table for data routing with the receiving node exists on the fourth node, or the fourth node is the receiving node; and establishing the first routing table based on the identifier of the fourth node.

According to this method, an example beneficial effect includes: In response to the forwarding node finding that a routing table for data routing with the receiving node does not exist in the forwarding node, the forwarding node calls to further send a packet to find a node that routes data with the receiving node, and then construct a routing table by using a packet sent by the node that routes data with the receiving node, so that the forwarding node is configured to have the routing table for data routing with the receiving node.

In some embodiments, in response to the routing table for data routing with the receiving node existing on the fourth node, the fourth packet further includes the identifier of the receiving node.

In some embodiments, the method further includes: in response to the first identifier being a destination broadcast identifier, sending a second packet to the second node.

According to this method, an example beneficial effect includes: in response to a destination identifier in the packet received by the forwarding node being a broadcast identifier, a previous-hop node does not have a routing table that is used for data routing with the final receiving node. Therefore, the forwarding node calls to feed back information to the previous-hop node, so that the previous-hop node knows that the forwarding node has the routing table that is used for data routing with the final receiving node and a routing table is subsequently constructed between the previous hop and the node.

In some embodiments, the second node is a forwarding node.

In some embodiments, the first packet or the second packet further includes an identifier of a sending node, and the method further includes: determining a second routing table based on the first packet, where the second routing table is used for data routing to the sending node.

According to this method, an example beneficial effect includes: The identifier of the sending node is included in the first packet or the second packet, therefore, the first node that receives the packet constructs, based on the identifier of the second node and the identifier of the sending node in the packet, a routing table for data routing to the second node.

In some embodiments, the second routing table includes an initial identifier, a next-hop identifier, and the identifier of the sending node, where the initial identifier is an identifier of a node that is to send data, the next-hop identifier is an identifier of a node that receives the data, and the identifier of the sending node indicates that the data is finally sent to the sending node.

Some embodiments provide a communication method. The method is performed by a sending node and includes: determining that a first routing table does not exist, where the first routing table is used for data routing to a receiving node; determining a first packet, where the first packet includes an identifier of the sending node, a destination broadcast/multicast identifier, and an identifier of the receiving node; sending the first packet to a first node; receiving a second packet from the first node, where the second packet includes an identifier of the first node, the identifier of the sending node, and the identifier of the receiving node; and determining the first routing table based on the second packet.

In the foregoing method, in response to performing SL communication, the sending node first queries whether the sending node has the routing table corresponding to the receiving node. in response to the sending node has the routing table corresponding to the receiving node, data is directly routed. in response to the sending node not having the routing table corresponding to the receiving node, a connection link for data routing with the receiving node is constructed by sending a packet, to facilitate subsequent data sending.

In some embodiments, the determining that a first routing table does not exist includes: determining, based on the identifier of the receiving node, that a routing table for data routing with the receiving node does not exist.

Some embodiments provide a communication apparatus, including: a receiving unit, configured to receive a first packet from a second node, where the first packet includes an identifier of the second node, a first identifier, and an identifier of a receiving node; and a processing unit, configured to: determine, based on the first packet, whether the first node is the receiving node, and in response to a determination being made that the first node is the receiving node and the first identifier is a destination broadcast identifier, send a second packet to the second node, where the second packet includes the identifier of the receiving node and an identifier of the first node, or determine a first routing table based on the first packet in response to a determination being made that the first node is not the receiving node, where the first routing table is used for data routing to the receiving node.

In some embodiments, the processing unit is configured to determine the first routing table based on a routing table that is on the first node and that is for data routing with the receiving node.

In some embodiments, the apparatus further includes a sending unit, where the sending unit is configured to send a third packet to another node in a multicast and/or broadcast manner, and the third packet includes the identifier of the receiving node; the receiving unit is further configured to receive a fourth packet from a fourth node, where the fourth packet includes an identifier of the fourth node and an identifier of the first node, and a routing table for data routing with the receiving node exists on the fourth node, or the fourth node is the receiving node; and the processing unit is further configured to establish the first routing table based on the identifier of the fourth node.

In some embodiments, in response to the routing table for data routing with the receiving node existing on the fourth node, the fourth packet further includes the identifier of the receiving node.

In some embodiments, the sending unit is further configured to: in response to the first identifier being a destination broadcast identifier, send a second packet to the second node.

In some embodiments, the second node is a forwarding node.

In some embodiments, the first packet or the second packet further includes an identifier of a sending node, and the processing unit is further configured to determine a second routing table based on the first packet, where the second routing table is used for data routing to the sending node.

In some embodiments, the second routing table includes an initial identifier, a next-hop identifier, and the identifier of the sending node, where the initial identifier is an identifier of a node that is to send data, the next-hop identifier is an identifier of a node that receives the data, and the identifier of the sending node indicates that the data is finally sent to the sending node.

Some embodiments provide a communication apparatus, including: a processing unit, configured to: determine that a first routing table does not exist, where the first routing table is used for data routing to a receiving node, and determine a first packet, where the first packet includes an identifier of a sending node, a destination broadcast/multicast identifier, and an identifier of the receiving node; a sending unit, configured to send the first packet to a first node; and a receiving unit, configured to receive a second packet from the first node, where the second packet includes an identifier of the first node, the identifier of the sending node, and the identifier of the receiving node. The processing unit is further configured to determine the first routing table based on the second packet.

In some embodiments, the processing unit is configured to determine, based on the identifier of the receiving node, that a routing table for data routing with the receiving node does not exist.

Some embodiments provide a communication apparatus that includes at least one processor. The processor is configured to execute instructions stored in a memory, so that a terminal performs any possible implementation.

Some embodiments provide a communication apparatus that includes at least one processor. The processor is configured to execute instructions stored in a memory, so that a terminal performs any possible implementation.

Some embodiments provide a communication device that is configured to perform any possible implementation.

Some embodiments provide a communication system that includes a sending node, at least one forwarding node, and a receiving node, where the at least one forwarding node is configured to perform any possible implementation, and the sending node is configured to perform any possible implementation.

Some embodiments provide a communication method. The method is performed by forwarding user equipment UE, where the forwarding UE is configured to forward data between at least one sending UE and at least one receiving UE. The forwarding UE includes a first identifier and a second identifier. The first identifier and the second identifier are used to establish sidelink SL communication for first sending UE and first receiving UE. There is a mapping relationship between the first identifier and the second identifier. The method includes: receiving a first data packet sent by previous-hop forwarding UE or the first sending UE, where the first data packet includes a first initial identifier, a first next-hop identifier, and an identifier of the first receiving UE, the first initial identifier is an identifier of the previous-hop forwarding UE or an identifier of the first sending UE, the first next-hop identifier is the first identifier, and the identifier of the first receiving UE is used to determine whether the forwarding UE includes the identifier of the first receiving UE; determining, at a BAP layer, an identifier of next-hop UE, where the identifier of the next-hop UE is obtained by the forwarding UE by searching for, based on an identifier to which the first next-hop identifier is mapped, a routing table that is associated with the mapping identifier, and obtaining the identifier of the next-hop UE from the routing table; and forwarding the first data packet to UE corresponding to the identifier of the next-hop UE, where at a MAC layer, the first initial identifier in the first data packet is indicated to be set to the second identifier, and the first next-hop identifier in the first data packet is indicated to be set to the identifier of the next-hop UE.

In some embodiments, before the determining, at a BAP layer, an identifier of next-hop UE, the method further includes: determining that the identifier of the first receiving does not exist at the BAP layer.

In some embodiments, in response to the forwarding UE including one receiving BAP layer and one sending BAP layer, and the receiving BAP layer or the sending BAP layer is shared by SL connections, the determining, at a BAP layer, an identifier of next-hop UE includes: after receiving the first data packet, determining, by the receiving BAP layer based on the identifier of the first receiving UE in the first data packet, whether the identifier of the first receiving UE exists; in response to determining that the identifier of the first receiving UE does not exist, sending, by the receiving BAP layer, the first data packet to the sending BAP layer; and determining, by the sending BAP layer, the identifier of the next-hop UE based on the first initial identifier in the first data packet, and then forwarding the first data packet to a bearer for the SL communication that is established between the first sending UE and the first receiving.

In some embodiments, in response to the forwarding UE including one BAP layer, and the BAP layer is shared by SL connections, the determining, at a BAP layer, an identifier of next-hop UE includes: after receiving the first data packet, determining, by the BAP layer based on the identifier of the first receiving UE in the first data packet, whether the identifier of the first receiving UE exists; and in response to determining that the identifier of the first receiving UE does not exist, determining, by the BAP layer, the identifier of the next-hop UE based on the first initial identifier in the first data packet, and then forwarding the first data packet to a bearer for the SL communication that is established between the first sending UE and the first receiving.

In some embodiments, in response to the forwarding UE including at least two receiving BAP layers and at least two sending BAP layers, each receiving BAP layer and each sending BAP layer correspond to one SL connection, and each SL connection corresponds to one SL bearer, the determining, at a BAP layer, an identifier of next-hop UE includes: after receiving the first data packet by using an SL bearer corresponding to a first receiving BAP layer, determining, by the first receiving BAP layer based on the identifier of the first receiving UE in the first data packet, whether the identifier of the first receiving UE exists; in response to determining that the identifier of the first receiving UE does not exist, sending, by the first receiving BAP layer, the first data packet to a first sending BAP layer; and determining, by the first sending BAP layer, the identifier of the next-hop UE based on the first initial identifier in the first data packet, and then forwarding the first data packet to an SL bearer corresponding to the first sending BAP layer, where the first receiving BAP layer and the first sending BAP layer perform data routing for an SL established by the first sending UE and the first receiving UE.

In some embodiments, in response to the forwarding UE including at least two BAP layers, each BAP layer corresponds to one SL connection, and each SL connection corresponds to at least two SL bearers, the determining, at a BAP layer, an identifier of next-hop UE includes: after receiving the first data packet by using a first SL bearer corresponding to a first BAP layer, determining, by the first BAP layer based on the identifier of the first receiving UE in the first data packet, whether the identifier of the first receiving UE exists; and in response to determining that the identifier of the first receiving UE does not exist, determining, by the first BAP layer, the identifier of the next-hop UE based on the first initial identifier in the first data packet, and then forwarding the first data packet to a second SL bearer corresponding to the first BAP layer, where the first BAP layer performs data routing for an SL established by the first sending UE and the first receiving UE, the first SL bearer is used to receive the first data packet, and the second SL bearer is used to send a second data packet.

Some embodiments provide a communication method. The method is performed by forwarding user equipment UE, where the forwarding UE is configured to forward data between at least one sending UE and at least one receiving UE. The forwarding UE includes a first identifier. The first identifier is used to establish sidelink SL communication for first sending UE and first receiving UE. The method includes: receiving a first data packet sent by previous-hop forwarding UE or the first sending UE, where the first data packet includes a first initial identifier, a first next-hop identifier, and an identifier of the first receiving UE, the first initial identifier is an identifier of the previous-hop forwarding UE or an identifier of the first sending UE, the first next-hop identifier is the first identifier, and the identifier of the first receiving UE is used to determine whether the forwarding UE includes the identifier of the first receiving UE; determining, at a BAP layer, an identifier of next-hop UE, where the identifier of the next-hop UE is obtained by the forwarding UE by searching for, based on the first next-hop identifier, a routing table that is associated with the first next-hop identifier, and obtaining the identifier of the next-hop UE from the routing table; and forwarding the first data packet to UE corresponding to the identifier of the next-hop UE, where at a MAC layer, the first initial identifier in the first data packet is indicated to be set to the first identifier, and the first next-hop identifier in the first data packet is indicated to be set to the identifier of the next-hop UE.

Some embodiments provide a communication method. The method is performed by forwarding user equipment UE, where the forwarding UE is configured to forward data between at least one sending UE and at least one receiving UE. The forwarding UE includes a first identifier. The first identifier is used to establish sidelink SL communication between the at least one sending UE and the at least one receiving UE. The method includes: receiving a first data packet sent by previous-hop forwarding UE or first sending UE, where the first data packet includes a first initial identifier, a first next-hop identifier, a BAP identifier and an identifier of receiving UE, the first initial identifier is an identifier of the previous-hop forwarding UE or an identifier of the first sending UE, the first next-hop identifier is the first identifier, and the identifier of the receiving UE is used to determine whether the forwarding UE includes the identifier of the receiving UE; determining, based on the first initial identifier and the first next-hop identifier, a quantity of receiving UEs that receives a data packet sent by the previous-hop forwarding UE or the first sending UE; and in response to a determination being made that there are at least two receiving UEs, adding a BAP layer, where the BAP layer is configured to search for, based on the first next-hop identifier and the identifier of the receiving UE, a routing table that is associated with the first next-hop identifier and with the identifier of the receiving UE, and then obtaining an identifier of next-hop UE from the routing table.

In some embodiments, the method further includes: forwarding the first data packet to UE corresponding to the identifier of the next-hop UE, where at a MAC layer, the first initial identifier in the first data packet is indicated to be set to the first identifier, and the first next-hop identifier in the first data packet is indicated to be set to the identifier of the next-hop UE.

In some embodiments, the method further includes: in response to a determination being made that there is one receiving UE, forwarding the first data packet to next-hop forwarding UE or the receiving UE, where at a MAC layer, the first initial identifier in the first data packet is indicated to be set to the first identifier, and the first next-hop identifier in the first data packet is indicated to be set to the identifier of the next-hop UE or the identifier of the receiving UE.

Some embodiments provide a communication method. The method is performed by forwarding user equipment UE, where the forwarding UE is configured to forward data between at least one sending UE and at least one receiving UE. The forwarding UE includes a first identifier. The first identifier is used to establish sidelink SL communication between the at least one sending UE and the at least one receiving UE. The method includes: receiving a first data packet sent by previous-hop forwarding UE or first sending UE, where the first data packet includes a first initial identifier, a first next-hop identifier, a first source identifier, and an identifier of receiving UE, the first initial identifier is an identifier of the previous-hop forwarding UE or an identifier of the first sending UE, the first next-hop identifier is the first identifier, the source identifier is the identifier of the first sending UE and indicates a corresponding PDCP layer in the receiving UE to receive the data packet, and the identifier of the receiving UE is used to determine whether the forwarding UE includes the identifier of the receiving UE; determining, at a BAP layer, an identifier of next-hop UE, where the identifier of the next-hop UE is obtained by the forwarding UE by searching for, based on the first next-hop identifier and the identifier of the receiving UE, a routing table that is associated with the first next-hop identifier and with the identifier of the receiving UE, and obtaining the identifier of the next-hop UE from the routing table; and forwarding the first data packet to UE corresponding to the identifier of the next-hop UE, where at a MAC layer, the first initial identifier in the first data packet is indicated to be set to the first identifier, and the first next-hop identifier in the first data packet is indicated to be set to the identifier of the next-hop UE.

Some embodiments provide a communication apparatus that includes at least one processor. The processor is configured to execute instructions stored in a memory, so that a terminal performs any possible implementation.

Some embodiments provide a communication device that is configured to perform any possible implementation.

Some embodiments provide a computer storage medium, where the computer-readable storage medium stores instructions. In response to the instructions being run on a computer, the computer is enabled to perform any possible implementation.

Some embodiments provide a computer program product including instructions. In response to the instructions being run on a computer, the computer is enabled to perform any possible implementation.

BRIEF DESCRIPTION OF DRAWINGS

The following briefly describes the accompanying drawings that call to be used in the descriptions of the embodiments or the current technology.

DESCRIPTION OF EMBODIMENTS

The following describes the technical solutions in the embodiments with reference to accompanying drawings.

Figure 1:
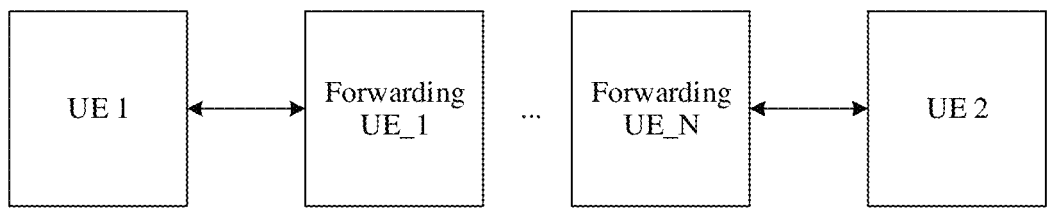
FIG. 1 is a schematic diagram of an architecture of a UE-to-UE forwarding system according to some embodiments.

To resolve a problem of a limited SL communication distance between UEs, a UE-to-UE forwarding system is introduced in some embodiments. As shown in FIG. 1, the UE-to-UE forwarding system includes one sending UE (UE 1), one receiving UE (UE 2), and at least one forwarding UE (forwarding UE_1 to forwarding UE_N). Data such as a service or signaling is transmitted between the UE 1 and the UE 2 through the at least one forwarding UE.

Figure 2:
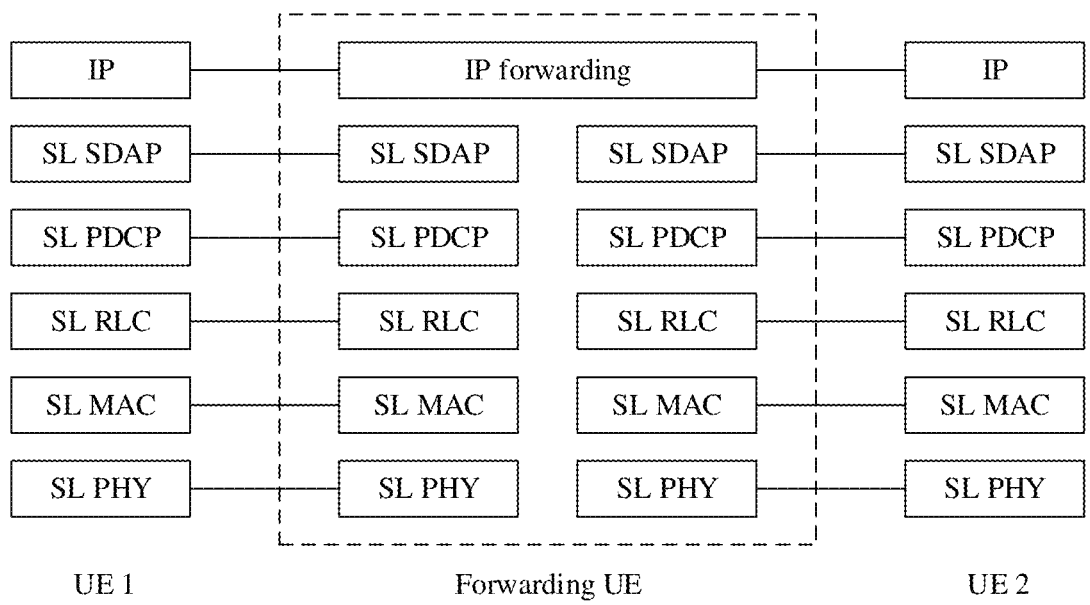
FIG. 2 is a schematic diagram of a user plane protocol stack in an L3 forwarding architecture of a UE-to-UE forwarding system according to some embodiments.
Figure 3:
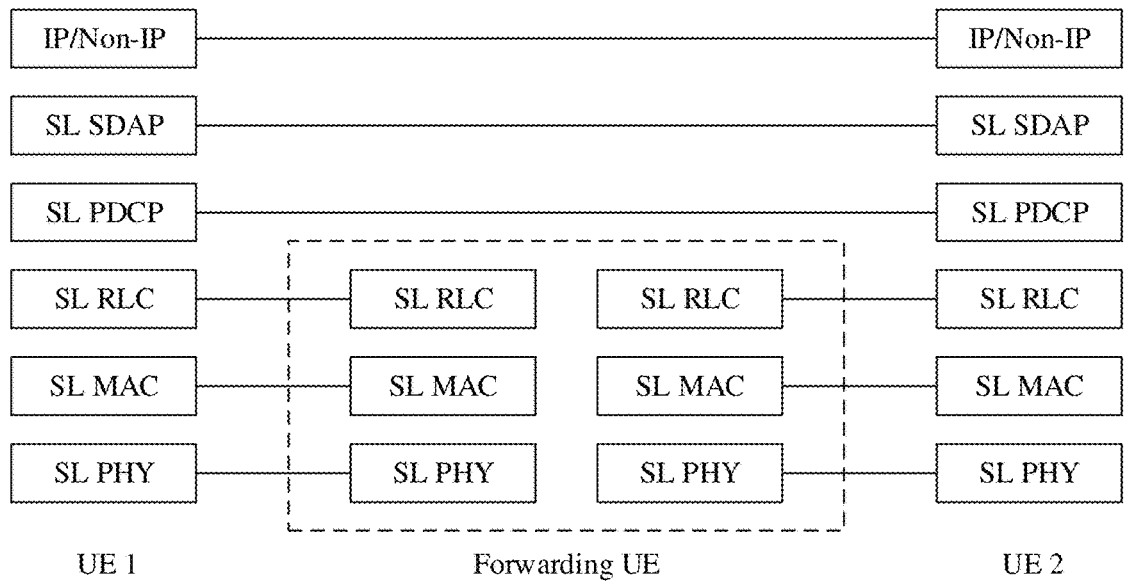
FIG. 3 is a schematic diagram of a user plane protocol stack in an L2 forwarding architecture of a UE-to-UE forwarding system according to some embodiments.

From a perspective of a transmission protocol stack, the UE-to-UE forwarding system is divided into a layer 3 (L3) forwarding architecture and a layer 2 (L2) forwarding architecture. For the L3 forwarding architecture, user data is relayed at an internet protocol (IP) layer. In this case, a user plane protocol stack is that shown in FIG. 2 (one forwarding UE is used as an example). For the L2 forwarding architecture, user data is relayed at a protocol layer below a packet data convergence protocol (PDCP) layer. In this case, a user plane protocol stack is that shown in FIG. 3 (one forwarding UE is used as an example).

Terms such as "user equipment" or "UE" in some embodiments further is replaced with "node", "network device", or the like. In other words, some embodiments are applicable to a relay system, and is not limited to the UE-to-UE forwarding system, for example, is an integrated access and backhaul (IAB) network system. In some embodiments, "packet" is replaced with "data" or "data packet".

In some embodiments, a destination multicast/broadcast identifier is equivalent to indication information indicating to construct a routing table. Certainly, dedicated indication information indicating whether to construct a reverse routing table further is added to each packet. In this way, after receiving the destination multicast/broadcast packet, UE does not call to query whether a corresponding routing table is stored. in response to no corresponding routing table being stored, a corresponding routing table is generated.

In some embodiments, that the UE 1 sends a packet to the UE 2 in a broadcast manner is understood as that the UE 1 sends the packet in a broadcast manner, and the UE 2 receives the broadcast packet.

In some embodiments, an identifier of UE is any identifier of the UE, for example, an application (APP) ID of the UE, or an SL L2 ID of the UE.

In some embodiments, each SL communication connection is an SL communication connection between receiving UE and sending UE. The communication connection is determined by using identifiers of the receiving UE and the sending UE corresponding to the communication connection. For example, each SL communication connection is identified by using one source L2 ID (an identifier of the sending UE) and one destination L2 ID (an identifier of the receiving UE). In some embodiments, at least one forwarding UE is further included between the receiving UE and the sending UE corresponding to each SL communication connection. For example, a relay connection sending data by UE 1 to UE 3 through UE 2 is considered as one SL communication connection. The SL communication connection actually includes two SLs: an SL 1 between the UE 1 and the UE 2 and an SL 2 between the UE 2 and the UE 3. The SL communication connection further is referred to as a forwarding connection.

In some embodiments, a sidelink radio bearer (SL RB) used to receive and send data on the SL refers to an SL RB of L2 forwarding UE, that is, includes at least one of a MAC layer, an SL logical channel (LCH), and an RLC layer. A BAP layer above the RLC layer is further included. The L2 SL RB is unable to include a PDCP layer. The sidelink radio bearer further refers to an SL RB of L3 forwarding UE, that is, the PDCP layer is included.

In some embodiments, in a protocol stack of a user equipment, a relay device, or a Uu interface of a network device, layer 1 (L1) generally refers to a PHY layer, layer 2 (L2) refers to a MAC layer, an RLC layer, an Adapt layer, or a PDCP layer, and layer 3 (L3) generally refers to an RRC layer, a NAS layer, or an IP layer. In some embodiments, a bearer includes one or more of a radio bearer (RB), an RLC bearer, or a MAC bearer. The RB includes a signaling radio bearer (SRB) and a data radio bearer (DRB). The SRB includes the PDCP layer and/or a channel between the PDCP layer and the RLC layer. The DRB includes the RRC layer and/or a channel between the RRC layer and the RLC layer. The RLC bearer includes the RLC layer and/or a logical channel between the RLC layer and the MAC layer. The MAC bearer includes the MAC layer and/or a transport channel between the MAC layer and the PHY layer. The bearer is identified by using a bearer identifier. The bearer identifier includes one or more of a signaling radio bearer identifier (SRB ID), a data radio bearer identifier (DRB ID), a logical channel identifier (LCID), or a quality of service flow (QoS flow) identifier. The bearer is identified by using a bearer index. The bearer index includes one or more of a signaling radio bearer index (signal radio bearer index), a data radio bearer index, or a logical channel identifier (LCID) index. A bearer identifier of a PDCP bearer is the DRB ID or the SRB ID. A bearer identifier of the RLC bearer is the LCID.

Figure 4:
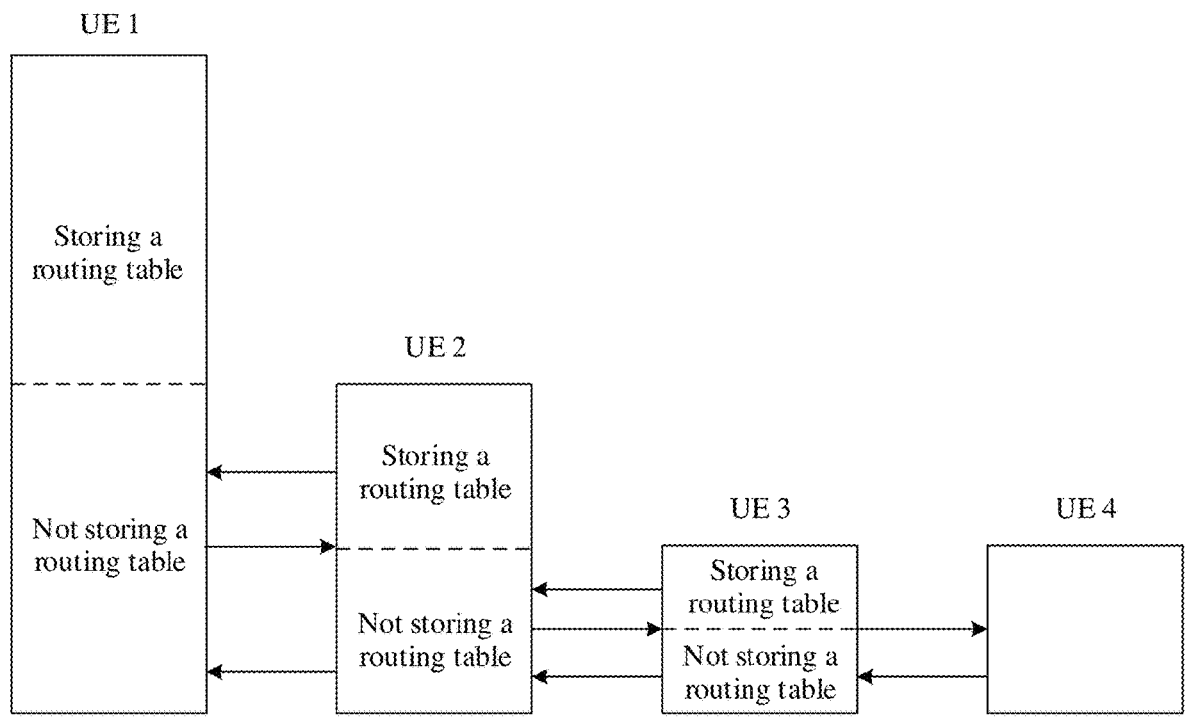
FIG. 4 is a schematic diagram of an SL communication architecture in a UE-to-UE forwarding system according to some embodiments.

FIG. 4 is a schematic diagram of an SL communication architecture in a UE-to-UE forwarding system according to some embodiments. As shown in FIG. 4, in a process in which UE 1 actively sends data to final receiving UE (the process is forward SL communication), two forwarding UEs are used as an example in some embodiments to describe forward SL communication between the UE 1 and UE 4. The UE 1 is referred to as sending UE, UE 2 and UE 3 is referred to as forwarding UEs, and the UE 4 is referred to as receiving UE.

For the UE 1, in a process of performing the forward SL communication with the UE 4, in response to the UE 1 determining that the UE 1 does not have a routing table for routing data from the UE 1 to the UE 4, the UE 1 sends a packet to another UE in a multicast or broadcast manner, to search for forwarding UE to forward a data packet to be sent by the UE 1 to the UE 4.

The UE 2 is one of other UEs to which the UE 1 sends the packet in the multicast or broadcast manner. After receiving the packet sent by the UE 1, the UE 2 queries whether the UE 2 has a routing table that performs forward SL communication with the UE 4. in response to the UE 2 having the routing table that performs the forward SL communication with the UE 4, the UE 2 sends a feedback packet to the UE 1, so that the UE 1 constructs the routing table for routing data from the UE 1 to the UE 4 and sends the data packet to the UE 4 through the UE 2. in response to the UE 2 not having the routing table that performs the forward SL communication with the UE 4, the UE 2 calls to further send a packet to another UE in a multicast or broadcast manner, and then searches for forwarding UE to forward the to-be-sent data packet to the UE 4.

The UE 3 is one of other UEs to which the UE 2 sends the packet in the multicast or broadcast manner. After receiving the packet sent by the UE 2, the UE 3 queries whether the UE 3 has a routing table that performs forward SL communication with the UE 4. in response to the UE 3 having the routing table that performs the forward SL communication with the UE 4, the UE 3 sends feedback information to the UE 2, so that the UE 2 constructs a routing table for data routing with the UE 3. Then, the UE 2 also sends feedback information to the UE 1, so that the UE 1 constructs the routing table for routing data from the UE 1 to the UE 4. in response to the UE 3 not having the routing table that performs the forward SL communication with the UE 4, the UE 3 calls to further send a packet to another UE in a multicast or broadcast manner, and then searches for forwarding UE to forward the to-be-sent data packet to the UE 4.

Optionally, after the UE 2 constructs the routing table for data routing with the UE 3, the UE 2 further is triggered to send the feedback information to the UE 1, so that the UE 1 constructs the routing table for routing data from the UE 1 to the UE 4 and sends the data packet to the UE 4 through the UE 2 and the UE 3.

The UE 4 is one of others UE to which the UE 3 sends the packet in the multicast or broadcast manner. After receiving the packet sent by the UE 3, in response to determining that the UE 4 is the final receiving UE of the data packet to be sent by the UE 1, the UE 4 sends feedback information to the UE 3, so that the UE 3 constructs a routing table for data routing with the UE 4.

Optionally, after the UE 3 constructs the routing table for data routing with the UE 4, the UE 3 further sends feedback information to the UE 2, so that the UE 2 constructs the routing table for data routing with the UE 3. Then, the UE 2 further sends the feedback information to the UE 1, so that the UE 1 constructs the routing table for routing data from the UE 1 to the UE 4 and sends the data packet to the UE 4 through the UE 2 and the UE 3.

In some embodiments, in response to SL communication being unable to be implemented between UEs due to a hardware capability, a distance, external interference, or the like, a UE-to-UE forwarding system is introduced. At least one forwarding UE is added between sending UE and receiving UE, and then a routing table for data transmission between the sending UE and forwarding UE, between forwarding UEs, and between the forwarding UE and the receiving UE is constructed, so that the sending UE sends data to the receiving UE.

The following describes, by using a flowchart, a process of forward SL communication between the UE 1 and the UE 4 in some embodiments.

Figure 5A:
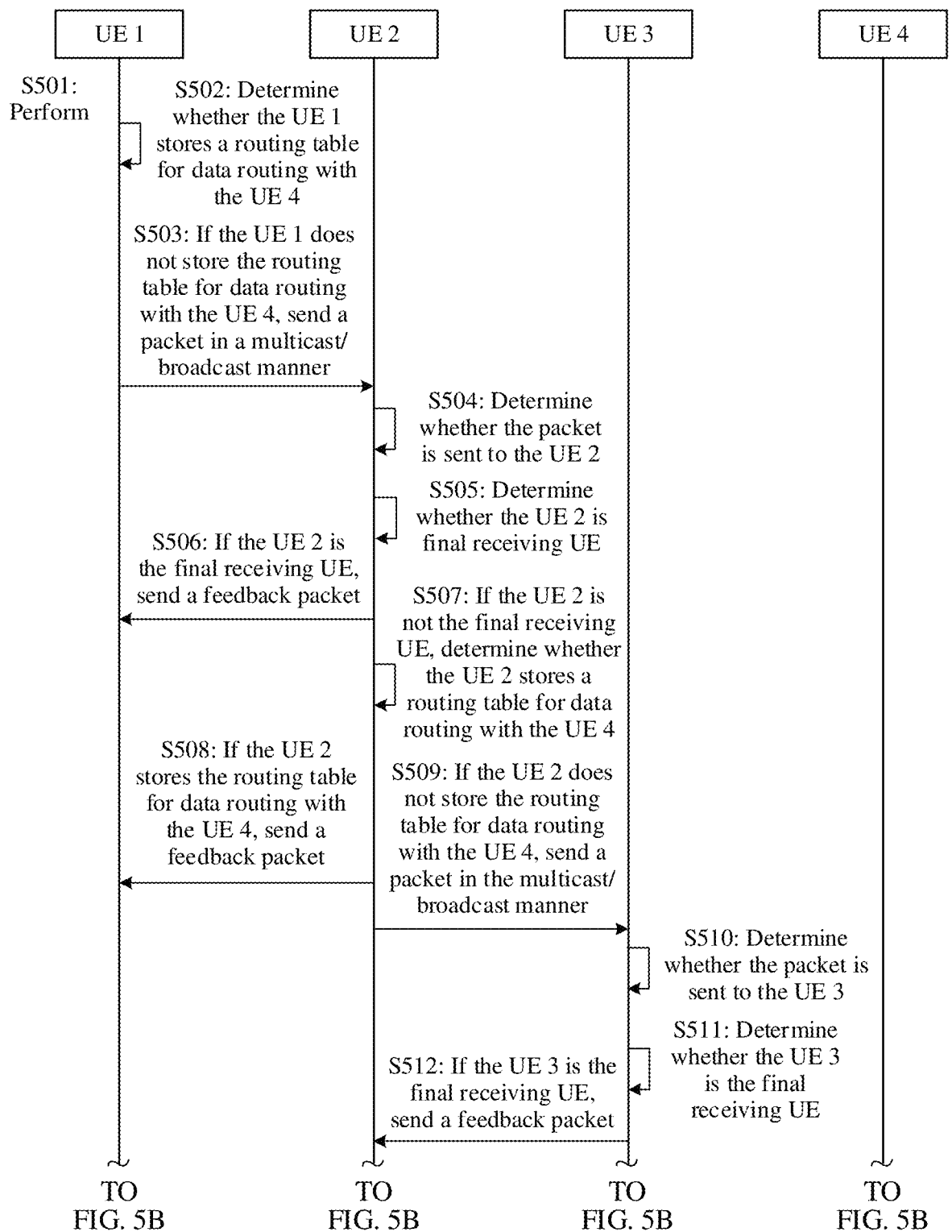
FIG. 5A and FIG. 5B is a schematic flowchart of SL communication in a UE-to-UE forwarding system according to some embodiments.
Figure 5B:
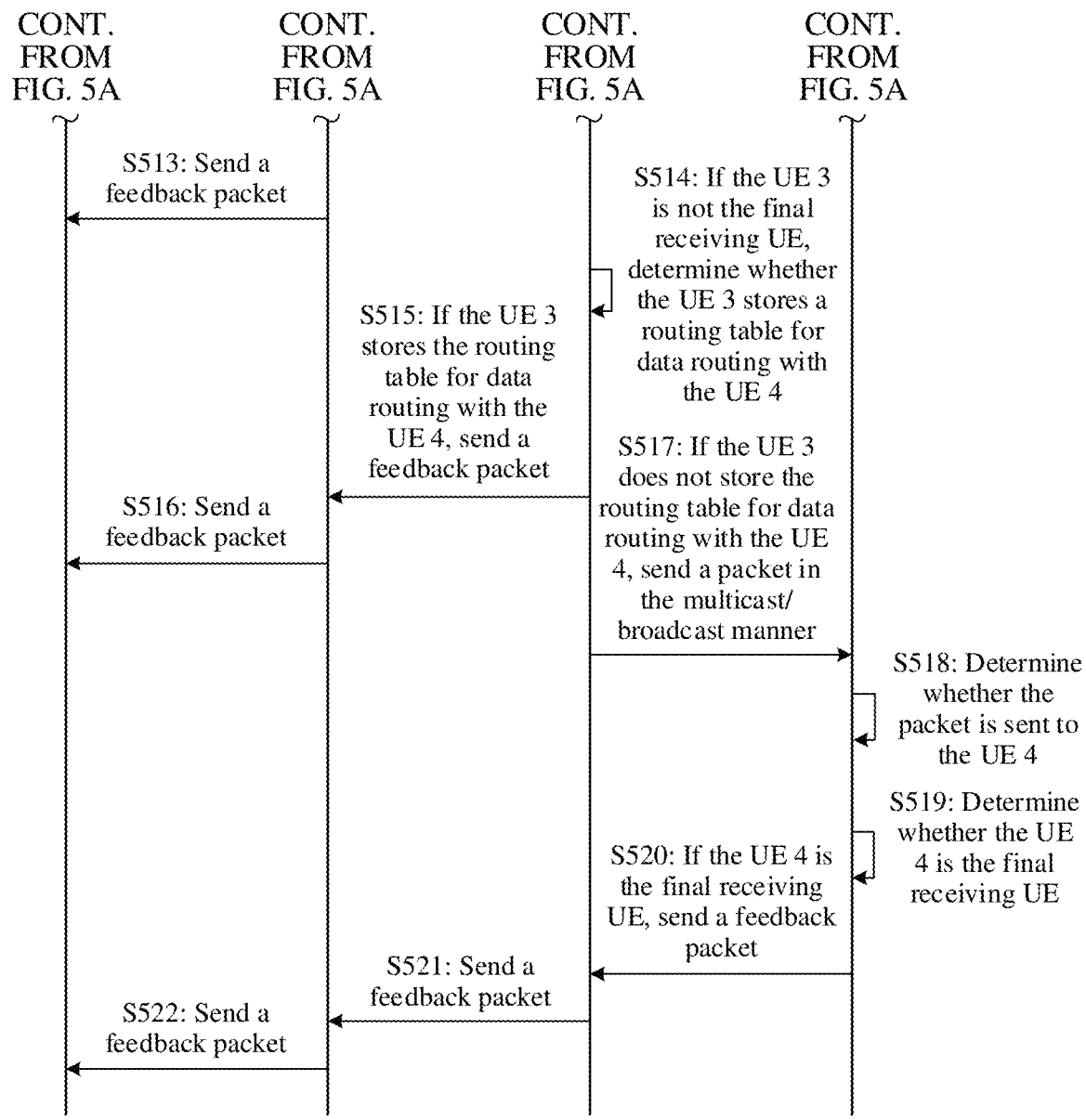

FIG. 5A and FIG. 5B is a schematic flowchart of SL communication in a UE-to-UE forwarding system according to some embodiments.

As shown in FIG. 5A and FIG. 5B, in some embodiments, two forwarding UEs are used as an example to describe a process of establishing SL communication between UE 1 and final receiving UE. A working process between UEs in the UE-to-UE forwarding system is as follows.

Step S501: The UE 1 performs forward SL communication with the final receiving UE.

Step S502: The UE 1 queries whether the UE 1 has a routing table for data routing with the final receiving UE. in response to the UE 1 having the routing table for data routing with the final receiving UE, the UE 1 directly performs the forward SL communication with the final receiving UE; or in response to the UE 1 not having the routing table for data routing with the final receiving UE, the UE 1 performs step S503.

In some embodiments, in a process in which the UE 1 sends a data packet to the final receiving UE, a routing table that is used to determine next-hop UE for forwarding the data packet includes one or more of an initial (PREY) identifier, a next-hop (NEXT) identifier, and a target (TGT) identifier. The PREY identifier indicates that the data packet is sent by UE corresponding to the identifier. The NEXT identifier indicates the next-hop UE to which the data packet is sent. The TGT identifier indicates the final receiving UE that finally receives the data packet.

For example, a manner in which the UE 1 queries whether the UE 1 has the routing table for data routing with the final receiving UE is as follows: After obtaining an identifier of the final receiving UE, the UE 1 queries, based on the identifier of the final receiving UE, TGT identifiers in routing tables stored in the UE 1, and determines whether any TGT identifier in the routing tables is the same as the identifier of the final receiving UE. in response to any TGT identifier in the routing tables being the same as the identifier of the final receiving UE, the UE 1 performs the forward SL communication with the final receiving UE; or in response to no TGT identifier in the routing tables being the same as the identifier of the final receiving UE, the UE 1 is unable to perform the forward SL communication with the final receiving UE.

Step S503: The UE 1 sends a packet in a multicast or broadcast manner.

The packet is any type of packet, for example, is a connection establishment request message, a route request message, or a user data packet. The packet is a first packet.

In some embodiments, a packet used for the forward SL communication generally carries one or more of a PREY identifier, a NEXT identifier, and a TGT identifier. The PREY identifier is an identifier of UE that sends the packet, the NEXT identifier is an identifier of UE that receives the packet or an identifier of next-hop UE, and the TGT identifier is an identifier of UE that finally receives the data packet and that performs the forward SL communication.

The packet sent by the UE 1 is sent in a broadcast, multicast, or unicast communication manner. Broadcast communication is similar to broadcasting system information with a base station, that is, UE sends broadcast data to the outside, and any other UE in an effective receiving range receives the broadcast data in response to the UE being interested in the broadcast data. Multicast communication refers to communication between UEs in a communication group, and any UE in the group receives and send data of a multicast service. Unicast communication is similar to data communication performed after an RRC connection is established between UE and a base station. A unicast connection calls to be first established between two UEs. After the unicast connection is established, the two UEs performs data communication based on a negotiated identifier. Data is encrypted or is unable to be encrypted. Compared with the broadcast communication, the unicast communication is performed between two UEs that have established a unicast connection.

For example, in response to the UE 1 sending the packet in the multicast or broadcast manner based on a condition (for example, a condition for a faster speed or a higher success rate to perform the forward SL communication with UE 4), the UE 1 sets the NEXT identifier carried in the packet as a destination multicast/broadcast identifier. The destination multicast identifier is an identifier corresponding to sending of one or more multicast services in a same group, and the destination broadcast identifier is an identifier corresponding to sending of a broadcast service.

Step S504: After receiving the packet sent by the UE 1, UE 2 determines, based on a NEXT identifier in the packet, whether the packet is sent to the UE 2. in response to the packet not being sent to the UE 2, subsequent operations are terminated; or in response to the packet being sent to the UE 2, step S505 is performed.

After receiving the packet sent by the UE 1, the UE 2 parses the packet. After obtaining the NEXT identifier, the UE 2 determines whether the NEXT identifier is an identifier corresponding to a broadcast service that the UE 2 has subscribed to (or an identifier corresponding to a multicast service subscribed to by a group to which the UE 2 belongs). In response to yes, the packet is sent to the UE 2. In response to not, the packet is not sent to the UE 2, and then the subsequent operations are terminated. Optionally, the UE 2 is unable to determine whether the packet is sent to the UE 2. For example, the UE 2 considers that the packet is sent to the UE 2. Then, in response to forwarding is called for, the UE 2 performs the forwarding unconditionally.

Step S505: The UE 2 determines, based on a TGT identifier in the packet sent by the UE 1, whether the UE 2 is the final receiving UE. in response to the UE 2 being the final receiving UE, the UE 2 performs step S506; or in response to the UE 2 not being the final receiving UE, the UE 2 performs step S507.

The UE 2 continues to parse the packet. After obtaining the TGT identifier, the UE 2 finds, based on the TGT identifier, whether an identifier of the UE 2 is the same as the TGT identifier. in response to the identifier of the UE 2 being the same as the TGT identifier, the UE 2 is the final receiving UE; or in response to the identifier of the UE 2 being different from the TGT identifier, the UE 2 is forwarding UE.

Step S506: In response to determining that the UE 2 is the final receiving UE, the UE 2 sends a feedback packet to the UE 1.

The feedback packet indicates that the UE 2 is the final receiving UE.

The feedback packet is a packet reconstructed by the UE 2, where a PREY identifier in the packet is the identifier of the UE 2, a NEXT identifier is an identifier of the UE 1, and a TGT identifier is still the identifier of the UE 2. Alternatively, the feedback packet is obtained by reconfiguring the packet sent in step S503 in a manner of setting the PREY identifier from an identifier of the UE 1 to the identifier of the UE 2, setting the NEXT identifier from the destination multicast/broadcast identifier to the identifier of the UE 1. Then, the feedback packet is sent to the UE 1.

After receiving the feedback packet, the UE 1 determines that there is the final receiving UE in multicast or broadcast objects in step S503, and constructs a routing table for data routing between the UE 1 and the UE 2, so that the UE 1 sends a data packet to the UE 2.

In this case, because a consideration is that the UE 2 is the final receiving UE, a NEXT identifier of the constructed routing table is the identifier of the UE 2, and/or a TGT identifier is the identifier of the UE 2. The packet is a second packet.

Step S507: In response to determining that the UE 2 is not the final receiving UE, the UE 2 further determines whether the UE 2 stores a routing table for data routing with the final receiving UE. in response to the UE 2 storing the routing table for data routing with the final receiving UE, the UE 2 performs step S508; or in response to the UE 2 not storing the routing table for data routing with the final receiving UE, the UE 2 performs step S509.

A manner in which the UE 2 queries whether the UE 2 has the routing table for data routing with the final receiving UE is the same as the query manner for the UE 1. After parsing out the identifier of the final receiving UE, the UE 2 queries, based on the identifier of the final receiving UE, TGT identifiers in routing tables stored in the UE 2, and determines whether any TGT identifier in the routing tables is the same as the identifier of the final receiving UE. in response to any TGT identifier in the routing tables being the same as the identifier of the final receiving UE, the UE 2 has the routing table for data routing with the final receiving UE; or in response to no TGT identifier in the routing tables being the same as the identifier of the final receiving UE, the UE 2 has no routing table for data routing with the final receiving UE.

Step S508: After determining that the UE 2 has the routing table for data routing with the final receiving UE, the UE 2 sends a feedback packet to the UE 1.

The feedback packet indicates that the UE 2 performs data routing with the final receiving UE.

As described in step S506, the feedback packet is a packet reconstructed by the UE 2, or is a packet obtained by reconfiguring the packet sent in step S503. Then, the feedback packet is sent to the UE 1.

After receiving the feedback packet, the UE 1 constructs a routing table for data routing between the UE 1 and the UE 2, and further construct a routing table for data routing between the UE 1 and the final receiving UE, so that the UE 1 sends a data packet to the UE 2.

In this case, a NEXT identifier of the constructed routing table is an identifier of the UE 2, and a TGT identifier is the identifier of the final receiving UE.

The packet is a second packet.

Step S509: After determining that the UE 2 does not have the routing table for data routing with the final receiving UE, the UE 2 further sends a packet in the multicast or broadcast manner.

The packet is a packet reconstructed by the UE 2, or is a packet obtained by reconfiguring the packet sent in step S503 in a manner of setting the PREY identifier from an identifier of the UE 1 to an identifier of the UE 2 and setting the NEXT identifier from the destination multicast/broadcast identifier to a destination multicast/broadcast identifier of the UE 2. Then, the packet is sent in the broadcast/multicast manner. The packet is a third packet.

In response to the UE 2 not having the routing table for data routing with the final receiving UE, the UE 2 is unable to perform data routing with the final receiving UE. In this case, the UE 2 chooses to give up further processing. Certainly, the UE 2 chooses to perform further processing, and then search for another UE, so that the UE 1 performs the forward SL communication with the final receiving UE through the UE 2 as a relay.

Step S510: After receiving the packet sent by the UE 2, UE 3 determines, based on a NEXT identifier in the packet, whether the packet is sent to the UE 3. in response to the packet not being sent to the UE 3, subsequent operations are terminated; or in response to the packet being sent to the UE 3, step S511 is performed.

This is the same as step S504: After receiving the packet sent by the UE 2, the UE 3 parses the packet. After obtaining the NEXT identifier, the UE 3 determines whether the NEXT identifier is an identifier corresponding to a broadcast service that the UE 3 has subscribed to (or an identifier corresponding to a multicast service subscribed to by a group to which the UE 3 belongs). In response to yes, the packet is sent to the UE 3. In response to not, the packet is not sent to the UE 3, and then the subsequent operations are terminated. Optionally, the UE 3 is unable to determine whether the packet is sent to the UE 3, that is, the UE 3 considers that the packet is sent to the UE 3. Then, in response to forwarding is called for, the UE 3 performs the forwarding unconditionally.

Step S511: The UE 3 determines, based on a TGT identifier in the packet sent by the UE 2, whether the UE 3 is the final receiving UE. in response to the UE 3 being the final receiving UE, the UE 3 performs step S512; or in response to the UE 3 not being the final receiving UE, the UE 3 performs step S514.

This is the same as step S505: The UE 3 continues to parse the packet. After obtaining the TGT identifier, the UE 3 finds, based on the TGT identifier, whether an identifier of the UE 3 is the same as the TGT identifier. in response to the identifier of the UE 3 being the same as the TGT identifier, the UE 3 is the final receiving UE; or in response to the identifier of the UE 3 being different from the TGT identifier, the UE 3 is forwarding UE.

Step S512: In response to determining that the UE 3 is the final receiving UE, the UE 3 sends a feedback packet to the UE 2.

The feedback packet indicates that the UE 3 is the final receiving UE.

As described in step S506, the feedback packet is a packet reconstructed by the UE 3, or is a packet obtained by reconfiguring the packet sent in step S509. Then, the feedback packet is sent to the UE 2.

The packet is a fourth packet.

After receiving the feedback packet, the UE 2 determines that there is the final receiving UE in multicast or broadcast objects in step S509, and constructs a routing table for data routing between the UE 2 and the UE 3, so that the UE 2 sends a data packet to the UE 3.

In this case, because a consideration is that the UE 3 is the final receiving UE, a NEXT identifier of the constructed routing table is the identifier of the UE 3 and a TGT identifier is the identifier of the UE 3.

Step S513: The UE 2 sends a feedback packet to the UE 1. The feedback packet indicates that the UE 2 performs data routing with the UE 4.

As described in step S506, the feedback packet is a packet reconstructed by the UE 2, or is a packet obtained by reconfiguring the packet sent in step S503. Then, the feedback packet is sent to the UE 1.

After receiving the feedback packet, the UE 1 constructs a routing table for data routing between the UE 1 and the UE 2, so that the UE 1 sends a data packet to the UE 2.

In this case, because a consideration is that the UE 3 is the final receiving UE, a NEXT identifier of the constructed routing table is the identifier of the UE 2 and a TGT identifier is the identifier of the UE 3.

The packet is a second packet.

Step S514: In response to determining that the UE 3 is not the final receiving UE, the UE 3 further determines whether the UE 3 stores a routing table for data routing with the final receiving UE. In response to the UE 3 storing the routing table for data routing with the final receiving UE, the UE 3 performs step S515; or in response to the UE 3 not storing the routing table for data routing with the final receiving UE, the UE 3 performs step S517.

This is the same as step S507: After parsing out the identifier of the final receiving UE, the UE 3 queries, based on the identifier of the final receiving UE, TGT identifiers in routing tables stored in the UE 3, and determines whether any TGT identifier in the routing tables is the same as the identifier of the final receiving UE. in response to any TGT identifier in the routing tables being the same as the identifier of the final receiving UE, the UE 3 has the routing table for data routing with the UE 4; or in response to no TGT identifier in the routing tables being the same as the identifier of the UE 4, the UE 3 has no routing table for data routing with the UE 4.

Step S515: After determining that the UE 3 has the routing table for data routing with the final receiving UE, the UE 3 sends a feedback packet to the UE 2.

The feedback packet indicates that the UE 3 performs data routing with the final receiving UE.

As described in step S506, the feedback packet is a packet reconstructed by the UE 3, or is a packet obtained by reconfiguring the packet sent in step S509. Then, the feedback packet is sent to the UE 2. The packet is a fourth packet.

After receiving the feedback packet, the UE 2 constructs a routing table for data routing between the UE 2 and the UE 3, so that the UE 2 sends a data packet to the UE 3.

In this case, a NEXT identifier of the constructed routing table is an identifier of the UE 2, and a TGT identifier is the identifier of the final receiving UE.

Step S516: The UE 2 sends a feedback packet to the UE 1.

The feedback packet indicates that the UE 2 performs data routing with the final receiving UE.

As described in step S506, the feedback packet is a packet reconstructed by the UE 2, or is a packet obtained by reconfiguring the packet sent in step S503. Then, the feedback packet is sent to the UE 1.

After receiving the feedback packet, the UE 1 constructs a routing table for data routing between the UE 1 and the UE 2, so that the UE 1 sends a data packet to the UE 2.

In this case, a NEXT identifier of the constructed routing table is the identifier of the UE 2, and a TGT identifier is the identifier of the final receiving UE.

The packet is a second packet.

Step S517: After determining that the UE 3 does not have the routing table for data routing with the UE 4, the UE 3 further sends a packet in the multicast or broadcast manner.

This is the same as step S509: The packet is a packet reconstructed by the UE 3, or is a packet obtained by reconfiguring the packet sent in step S509. Then, the packet is sent in the broadcast/multicast manner. A PREY identifier carried in the packet sent by the UE 3 is the identifier of the UE 3, a NEXT identifier is the destination multicast/broadcast identifier of the UE 2, and a TGT identifier is still the identifier of the final receiving UE.

In response to the UE 3 not having the routing table for data routing with the final receiving UE, the UE 3 is unable to perform data sending with the final receiving UE. In this case, the UE 3 chooses to give up further processing. Certainly, the UE 3 chooses to perform further processing, and then search for another UE, so that the UE 1 performs the forward SL communication with the final receiving UE through the UE 2 and the UE 3 as relays.

Step S518: After receiving the packet sent by the UE 3, the UE 4 determines, based on the NEXT identifier in the packet, whether the packet is sent to the UE 4. in response to the packet being not sent to the UE 4, subsequent operations are terminated; or in response to the packet being sent to the UE 4, step S519 is performed.

This is the same as step S504: After receiving the packet sent by the UE 3, the UE 4 parses the packet. After obtaining the NEXT identifier, the UE 4 determines whether the NEXT identifier is an identifier corresponding to a broadcast service that the UE 4 has subscribed to (or an identifier corresponding to a multicast service subscribed to by a group to which the UE 4 belongs). In response to yes, the packet is sent to the UE 4. In response to not, the packet is not sent to the UE 4, and then the subsequent operations are terminated. Optionally, the UE 4 is unable to determine whether the packet is sent to the UE 4, that is, the UE 4 considers that the packet is sent to the UE 4. Then, in response to forwarding is called for, the UE 4 performs the forwarding unconditionally.

Step S519: The UE 4 determines, based on an identifier of final receiving UE in the packet sent by the UE 3, whether the UE 4 is the final receiving UE. in response to the UE 4 being the final receiving UE, the UE 4 performs step S520; or in response to the UE 4 not being the final receiving UE, that is, in response to the UE 4 being a forwarding UE, steps similar to those for the UE 2 and the UE 3 are performed, and no analysis is called for in this case.

This is the same as step S505: The UE 4 parses the packet. After obtaining the TGT identifier, the UE 4 finds, based on the TGT identifier, whether an identifier of the UE 4 is the same as the TGT identifier. in response to the identifier of the UE 4 being the same as the TGT identifier, the UE 4 is the final receiving UE; or in response to the identifier of the UE 4 being different from the TGT identifier, the UE 4 is the forwarding UE.

Step S520: In response to determining that the UE 4 is final receiving UE, the UE 4 sends a feedback packet to the UE 3.

The feedback packet indicates that the UE 4 is the final receiving UE.

As described in step S506, the feedback packet is a packet reconstructed by the UE 4, or is a packet obtained by reconfiguring the packet sent in step S517. Then, the feedback packet is sent to the UE 3.

After receiving the feedback packet, the UE 3 determines that there is the final receiving UE in multicast or broadcast objects in step S517, and constructs a routing table for data routing between the UE 3 and the UE 4, so that the UE 3 sends a data packet to the UE 4.

In this case, because a consideration is that the UE 4 is the final receiving UE, a NEXT identifier of the constructed routing table is the identifier of the UE 4 and a TGT identifier is the identifier of the UE 4.

Step S521: The UE 3 sends a feedback packet to the UE 2. The feedback packet indicates that the UE 3 performs data routing with the UE 4.

As described in step S506, the feedback packet is a packet reconstructed by the UE 3, or is a packet obtained by reconfiguring the packet sent in step S509. Then, the feedback packet is sent to the UE 2. The packet is a fourth packet.

After receiving the feedback packet, the UE 2 constructs a routing table for data routing between the UE 2 and the UE 3, so that the UE 2 sends a data packet to the UE 3.

In this case, a NEXT identifier of the constructed routing table is the identifier of the UE 3, and a TGT identifier is the identifier of the UE 4.

Step S522: The UE 2 sends a feedback packet to the UE 1. The feedback packet indicates that the UE 2 performs data routing with the UE 4.

As described in step S506, the feedback packet is a packet reconstructed by the UE 2, or is a packet obtained by reconfiguring the packet sent in step S503. Then, the feedback packet is sent to the UE 1.

After receiving the feedback packet, the UE 1 constructs a routing table for data routing between the UE 1 and the UE 2, so that the UE 1 sends a data packet to the UE 2.

In this case, a NEXT identifier of the constructed routing table is the identifier of the UE 2, and a TGT identifier is the identifier of the UE 4.

The packet is a second packet.

In some embodiments, in response to forward SL communication between sending UE and receiving UE being established, at least one forwarding UE is added therebetween, so that the sending UE sends data to the receiving UE.

The following describes, from perspectives of routing table change and packet change, a process in which the UE 1 and the UE 4 perform the forward SL communication in some embodiments.

Figure 6:
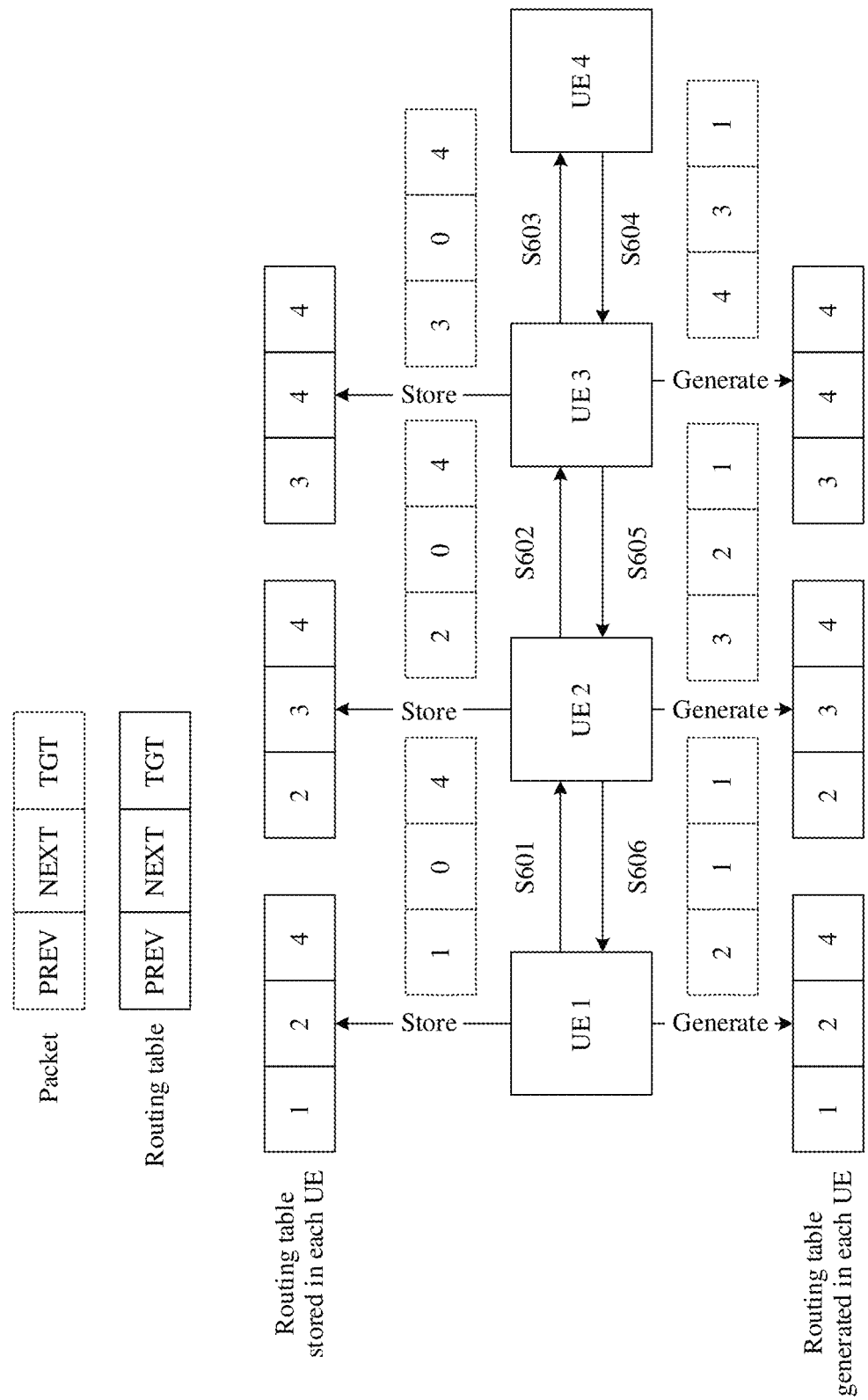
FIG. 6 is a schematic diagram of an architecture of routing table change and packet change in an SL communication process in a UE-to-UE forwarding system according to some embodiments.

FIG. 6 is a schematic diagram of an architecture of routing table change and packet change in an SL communication process in a UE-to-UE forwarding system according to some embodiments. As shown in FIG. 6, two forwarding UEs are still used as an example in some embodiments. UE 1 is the sending UE, UE 2 and UE 3 are the forwarding UEs, and UE 4 is receiving UE. SL communication constructed from the UE 1 to the UE 4 is described. In some embodiments, an identifier of the UE 1 is represented by "1", an identifier of the UE 2 is represented by "2", an identifier of the UE 3 is represented by "3", an identifier of the UE 4 or an identifier of receiving UE is represented by "4", and a destination multicast or broadcast identifier is represented by "0" (where an understanding is that the destination multicast identifier and the destination broadcast identifier is different).

For the UE 1, the UE 1 first queries whether the UE 1 has a routing table for data routing with the UE 4. The found routing table is (PREV: 1, NEXT: 2, TGT: 4).

Step S601: in response to a determination being made that the UE 1 does not have the routing table to the UE 4, the UE 1 sends a packet to the UE 2 in a multicast/broadcast manner. Identifiers carried in the packet include [PREV: 1, NEXT: 0, TGT: 4].

For the UE 2, after receiving the packet sent by the UE 1, the UE 2 first queries whether the UE 2 has a routing table for data routing with the UE 4. The routing table is (PREV: 2, NEXT: 3, TGT: 4).

Step S602: in response to a determination being made in S601 that the UE 2 does not have a routing table to the UE 3, the UE 2 sends a packet to the UE 3 in the multicast/broadcast manner. Identifiers carried in the packet include [PREV: 2, NEXT: 0, TGT: 4].

For the UE 3, after receiving the packet sent by the UE 2, the UE 3 first queries whether the UE 3 has a routing table for data routing with the UE 4. The found routing table is (PREV: 3, NEXT: 4, TGT: 4).

Step S603: in response to a determination being made in S602 that the UE 3 does not have a routing table to the UE 4, the UE 3 sends a packet to the UE 4 in the multicast/broadcast manner. Identifiers carried in the packet include [PREV: 3, NEXT: 0, TGT: 4].

Step S604: In response to the UE 4 determining, based on the received packet, that the UE 4 is final receiving UE, because NEXT in the packet sent in step S603 is the broadcast/multicast identifier, optionally, the UE 4 sends a packet to the UE 3. Identifiers carried in the packet include [PREV: 4, NEXT: 3, TGT: 1].

For the UE 3, after receiving the packet sent by the UE 4, the UE 3 constructs a routing table for data routing with the UE 4. A format of the constructed routing table is (PREV: 3, NEXT: 4, TGT: 4).

Step S605: After determining that the UE 3 performs data routing with the UE 4, because NEXT in the packet sent in step S602 is the broadcast/multicast identifier, optionally, the UE 3 sends a packet to the UE 2. Identifiers carried in the packet include [PREV: 3, NEXT: 2, TGT: 1].

For the UE 2, after receiving the packet sent by the UE 3, the UE 2 constructs a routing table for data routing with the UE 4. The constructed routing table is (PREV: 2, NEXT: 3, TGT: 4).

Step S606: After determining that the UE 2 performs data routing with the UE 4, because NEXT in the packet sent in step S601 is the broadcast/multicast identifier, optionally, the UE 2 sends a packet to the UE 1. Identifiers carried in the packet include [PREV: 2, NEXT: 1, TGT: 1].

For the UE 1, after receiving the packet sent by the UE 2, the UE 1 constructs a routing table for data routing with the UE 2. The constructed routing table is (PREV: 1, NEXT: 2, TGT: 4).

Optionally, in response to the routing table already existing, the routing table does not call to be reconstructed or added, and a format of the routing table includes one or more of a PREY identifier, a NEXT identifier, and a TGT identifier.

Figure 7:
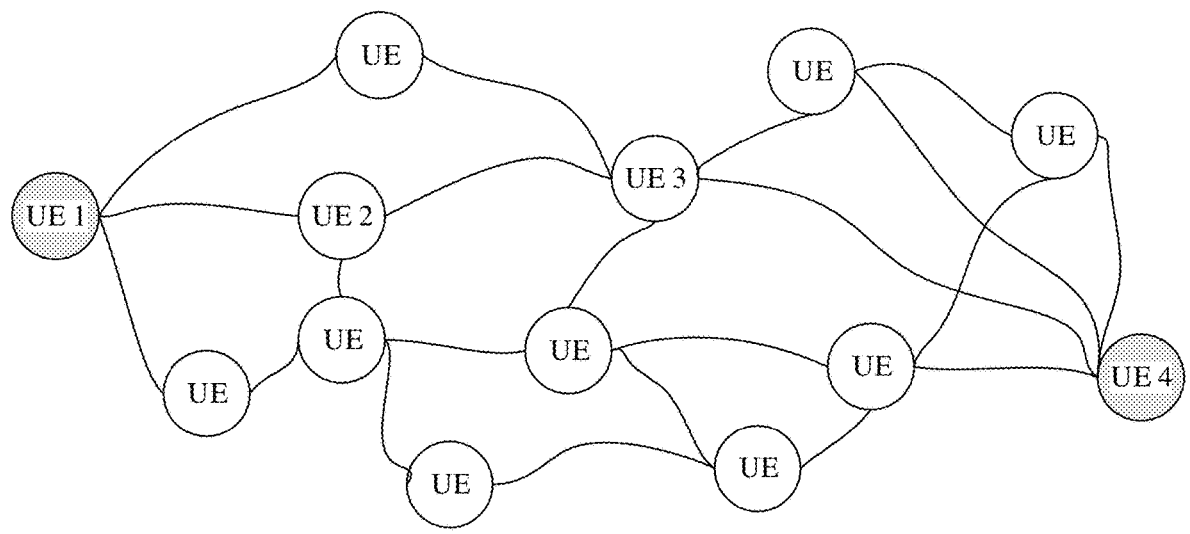
FIG. 7 is a schematic diagram of an SL communication architecture in another UE-to-UE forwarding system according to some embodiments.

In some embodiments, an example in which the UE 1 is the sending UE, the UE 2 and the UE 3 are the forwarding UEs, and the UE 4 is the receiving UE is used. However, according to the foregoing descriptions, manners in which the UE 1 sends the packet to the UE 2, the UE 2 sends the packet to the UE 3, and the UE 3 sends the packet to the UE 4 is the broadcast manner and the multicast manner. Therefore, a person skilled in the art knows that, in a process of establishing SL communication between the UE 1 and the UE 4, connection links are not limited to the foregoing connection link "UE 1→UE 2→UE 3→UE 4", but alternatively is that shown in FIG. 7. There is a plurality of connection links between the UE 1 and the UE 4. That is, each routing table includes a plurality of entries. For example, NEXT includes a plurality of options.

Figure 8:
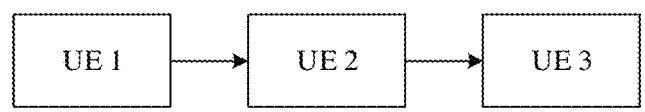
FIG. 8 is a schematic diagram of an SL communication architecture in a UE-to-UE forwarding system according to some embodiments.

FIG. 8 is a schematic diagram of an SL communication architecture in a UE-to-UE forwarding system according to some embodiments. As shown in FIG. 8, in a process in which UE 1 passively receives data (where the process is reverse SL communication), two forwarding UEs are used as an example in some embodiments to describe establishment of the reverse SL communication for the UE 1. The UE 1 is receiving UE, and UE 2 and UE 3 are forwarding UEs.

For the UE 1, in response to determining that a data packet from another UE is called for, in a process of actively initiating the reverse SL communication to the another UE, the UE 1 sends a packet to the another UE in a multicast or broadcast manner, to search for sending UE that sends a data packet to the UE 1.

The UE 2 is one of other UEs to which the UE 1 sends the packet in the multicast or broadcast manner. After receiving the packet sent by the UE 1, the UE 2 queries whether the UE 2 has a routing table that is used for data routing with the UE 1. in response to the UE 2 having the routing table that is used for data routing with the UE 1, the UE 2 terminates subsequent operations and waits for subsequent data packet sending. in response to the UE 2 not having the routing table that is used for data routing with the UE 1, the UE 2 constructs, based on the packet, the routing table that is used for data routing with the UE 1, to subsequently send a data packet to the UE 1.

After the UE 2 has the routing table for sending data to the UE 1, in response to the UE 2 intending to enable more other UEs to send data to the UE 1, the UE 2 further chooses to send a packet in the multicast/broadcast manner, so that the other UEs send the data to the UE 1 through forwarding by the UE 2.

The UE 3 is one of other UEs to which the UE 2 sends the packet in the multicast or broadcast manner. After receiving the packet sent by the UE 2, the UE 3 queries whether the UE 3 has a routing table that is used for data routing with the UE 1. in response to the UE 3 having the routing table that is used for data routing with the UE 1, the UE 3 terminates subsequent operations and waits for subsequent data packet sending. in response to the UE 3 not having the routing table that is used for data routing with the UE 1, the UE 3 constructs, based on the packet, a routing table that is used for data routing with the UE 2, so that the UE 3 subsequently sends a data packet to the UE 1 through the UE 2.

After the UE 3 has the routing table for sending data to the UE 1, in response to the UE 3 intending to enable more other UEs to send data to the UE 1, the UE 3 further chooses to send a packet in the multicast/broadcast manner, so that the other UEs send the data to the UE 1 through forwarding by the UE 2 and the UE 3.

A process performed by subsequent UE is basically the same as that performed by the UE 3, and details are not described herein.

Optionally, to avoid excessive network load caused by excessive broadcast messages, a forwarding threshold is described. Each forwarding UE first determines whether a quantity of forwarding times is greater than or equal to the threshold before forwarding, and in response to the quantity of forwarding times reaching the specified forwarding threshold, discards a packet, or in response to the quantity of forwarding times not reaching the specified threshold, increases the quantity of forwarding times by 1, and forwards a packet in the broadcast/multicast manner again. Similarly, the forwarding UE alternatively decreases the quantity of forwarding times by 1 and determine, depending on whether the quantity of forwarding times is less than or equal to 0, whether forwarding continues.

In some embodiments, in response to the reverse SL communication being established for the receiving UE, a packet is sent to corresponding UE, so that the corresponding UE constructs a reverse routing table and the UE constructs the reverse SL communication with the receiving UE. in response to more UEs calling to perform the reverse SL communication with the receiving UE, UE that has performed the reverse SL communication with the receiving UE further sends a packet, so that the UE serves as relay UE, and more other UEs perform the reverse SL communication with the receiving UE.

The following uses the UE 2 as an example to describe, by using a flowchart, a process in which the UE 1 and the UE 2 perform the reverse SL communication in some embodiments.

Figure 9:
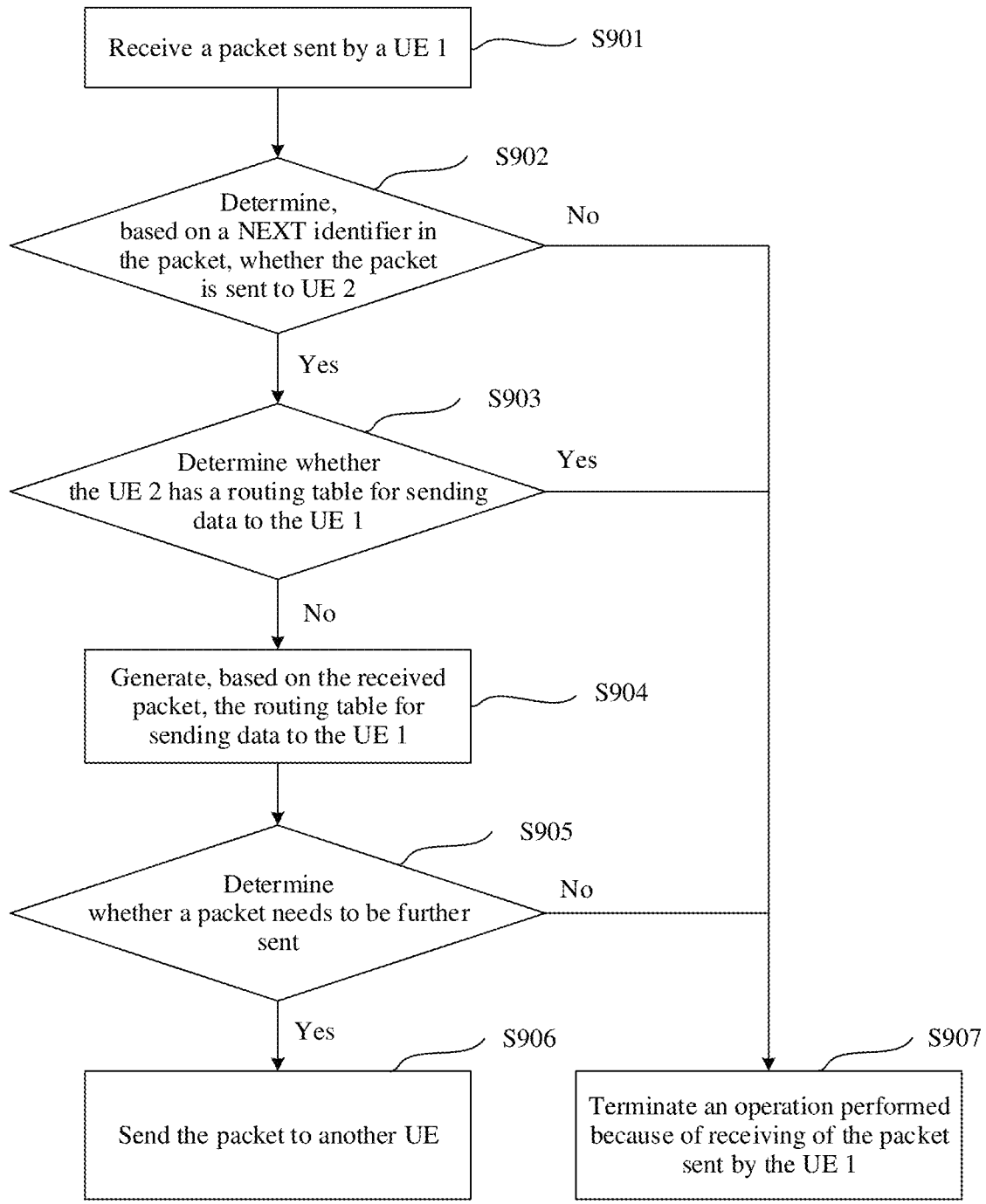
FIG. 9 is a schematic flowchart of reverse SL communication between UE 1 and UE 2 in a UE-to-UE forwarding system according to some embodiments.

FIG. 9 is a schematic flowchart of reverse SL communication between UE 1 and UE 2 in a UE-to-UE forwarding system according to some embodiments. As shown in FIG. 9, a working process of the UE 2 is as follows.

Step S901: The UE 2 receives a packet sent by the UE 1.

In some embodiments, a packet that is sent by the UE 1 to another UE and that is used to perform the reverse SL communication generally carries one or more of a PREY identifier, a NEXT identifier, and an SRC identifier. The PREY identifier is an identifier of UE that sends the packet, the NEXT identifier is an identifier of UE that receives the packet, and the SRC identifier is an identifier of UE that initially sends a packet to receive a data packet sent by another UE. The SRC identifier further is referred to as an initial identifier.

If the UE 1 sends the packet in a multicast or broadcast manner, the PREY identifier carried in the packet is an identifier of the UE 1, the NEXT identifier is a destination multicast/broadcast identifier, and the SRC identifier is the identifier of the UE 1. The destination multicast identifier is an identifier corresponding to a same multicast service subscribed to by a same group, and the destination broadcast identifier is an identifier corresponding to a same broadcast service subscribed to.

Step S902: The UE 2 determines, based on the NEXT identifier in the packet, whether the packet is sent to the UE 2. In response to the packet being sent to the UE 2, step S903 is performed; or in response to the packet not being sent to the UE 2, step S907 is performed.

After receiving the packet sent by the UE 1, the UE 2 parses the packet. After obtaining the NEXT identifier, the UE 2 determines whether the NEXT identifier is an identifier corresponding to a broadcast service that the UE 2 has subscribed to (or an identifier corresponding to a multicast service subscribed to by a group to which the UE 2 belongs). In response to yes, the packet is sent to the UE 2. In response to not, the packet is not sent to the UE 2, and then subsequent operations are terminated.

Step S903: The UE 2 determines whether the UE 2 has a reverse routing table for data routing with the UE 1. In response to the UE 2 does not have the reverse routing table for data routing with the UE 1, the UE 2 performs step S904; or in response to the UE 2 having the reverse routing table for data routing with the UE 1, the UE 2 performs step S907.

In some embodiments, for the another UE, in a process of sending a data packet to the UE 1, a reverse routing table that is used to determine next-hop UE to which the data packet is forwarded includes a PREY identifier (optional), a NEXT identifier, and a TGT identifier. The PREY identifier indicates that the data packet is sent from the identifier. The NEXT identifier is used to determine the next-hop UE to which the data packet is sent. The TGT identifier is used to determine UE that finally receives the data packet.

For example, the UE 2 continues to parse the packet. After obtaining the SRC identifier, the UE 2 queries, based on the identifier of the UE 1, TGT identifiers in routing tables stored in the UE 2, and determines whether any TGT identifier in the routing tables is the same as the identifier of the UE 1. In response to any TGT identifier in the routing tables being the same as the identifier of the UE 1, the UE 2 has the reverse routing table for data routing with the UE 1; or in response to no TGT identifier in the routing tables being the same as the identifier of the UE 1, the UE 2 does not have the reverse routing table for data routing with the UE 1.

Step S904: The UE 2 generates, based on the received packet, the reverse routing table for data routing with the UE 1.

The UE 2 chooses to perform further processing, and construct, based on the PREY identifier and the SRC identifier in the packet received from the UE 1, the reverse routing table for data routing with the UE 1, so that the UE 2 subsequently sends a data packet to the UE 1. In the constructed reverse routing table, a PREY identifier is an identifier of the UE 2, a NEXT identifier is the identifier of the UE 1, and a TGT identifier is the identifier of the UE 1.

Step S905: The UE 2 determines whether a packet calls to be further sent. In response to a packet calling to be further sent, step S906 is performed; or in response to no packet calling to be further sent, step S907 is performed.

After the UE 2 has the reverse routing table for sending data to the UE 1, in response to the UE 2 intending to enable more other UEs to send data to the UE 1, the UE 2 further chooses to send the packet in the multicast/broadcast manner, so that the other UEs send the data to the UE 1 through the UE 2 as a relay. Optionally, before sending the packet in the multicast/broadcast manner, the UE 2 first determines whether a quantity of forwarding times is greater than or equal to a threshold. in response to the quantity of forwarding times reaching the specified forwarding threshold, the UE 2 does not send the packet. in response to the quantity of forwarding times not reaching the specified threshold, the UE 2 performs broadcast/multicast forwarding, and further increases the quantity of forwarding times by 1. Similarly, a threshold alternatively is preset. Each time a packet is sent in the multicast/broadcast manner, an operation of decreasing a quantity of forwarding times by 1 is performed, and whether forwarding continues is determined depending on whether the quantity of forwarding times is less than or equal to 0. The quantity of forwarding times are carried in packets received and sent by the UE 2. The quantity of forwarding times are a quantity of multicast/broadcast times of UE, or is a quantity of multicast/broadcast times of a forwarding system caused by multicast/broadcast of the UE 1.

Step S906: The UE 2 sends the packet to another UE in the multicast or broadcast manner.

The packet is a packet reconstructed by the UE 2, or is a packet obtained by reconfiguring the packet sent in step S901 in a manner of setting the PREY identifier from the identifier of the UE 1 to the identifier of the UE 2 and setting the NEXT identifier from the destination multicast/broadcast identifier to a destination multicast/broadcast identifier of the UE 2. Then, the packet is sent in the broadcast/multicast manner.

Step S907: The UE 2 terminates an operation performed because of receiving of the packet sent by the UE 1.

In some embodiments, in response to reverse SL communication being established for receiving UE, a packet is sent to corresponding UE, so that the corresponding UE constructs a reverse routing table and the UE constructs the reverse SL communication with the receiving UE. in response to the receiving UE expecting more UEs to perform the reverse SL communication with the receiving UE, the receiving UE enables UE that has performed the reverse SL communication with the receiving UE to further send a packet, so that the UE serves as relay UE, and more other UEs perform the reverse SL communication with the receiving UE.

The following describes, from perspectives of routing table change and packet change, a process in which the UE 1 performs the reverse SL communication in some embodiments.

Figure 10:
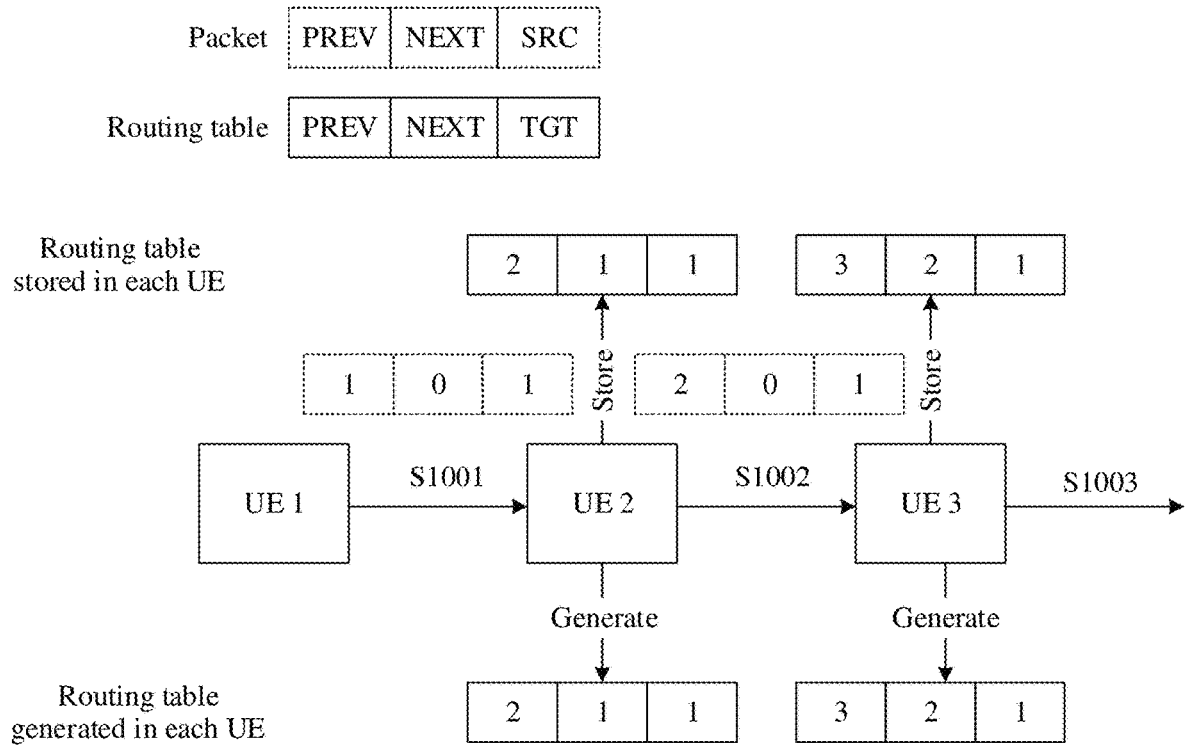
FIG. 10 is a schematic diagram of an architecture of routing table change and packet change in an SL communication process in a UE-to-UE forwarding system according to some embodiments.

FIG. 10 is a schematic diagram of an architecture of routing table change and packet change in an SL communication process in a UE-to-UE forwarding system according to some embodiments. As shown in FIG. 10, in some embodiments, two forwarding UEs are still used as an example to describe establishment of reverse SL communication for UE 1. In some embodiments, an identifier of the UE 1 is represented by "1", an identifier of UE 2 is represented by "2", an identifier of UE 3 is represented by "3", and a destination multicast/broadcast identifier is represented by "0".

Step S1001: In a process of sending a packet to the UE 2, the UE 1 sends the packet to the UE 2 in a multicast/broadcast manner, where identifiers carried in the packet include [PREV: 1, NEXT: 0, SRC: 1].

For the UE 2, after receiving the packet sent by the UE 1, the UE 2 first queries whether the UE 2 has a reverse routing table for data routing with the UE 1. The found prestored reverse routing table is (PREV: 2, NEXT: 1, TGT: 1) or (NEXT: 1, TGT: 1). In response to no reverse routing table being found, the reverse routing table is generated based on the received packet.

(Optional) Step S1002: The UE 2 sends a packet to the UE 3 in the multicast/broadcast manner, where identifiers carried in the packet include [PREV: 2, NEXT: 0, SRC: 1].

For the UE 3, after receiving the packet sent by the UE 2, the UE 3 first queries whether the UE 3 has a reverse routing table for data routing with the UE 1. The found prestored reverse routing table is (PREV: 3, NEXT: 2, TGT: 1) or (NEXT: 2, TGT: 1). In response to no reverse routing table being found, the reverse routing table is generated based on the received packet.

In some embodiments, an example in which the UE 1 is sending UE is used. However, according to the foregoing descriptions, manners in which the UE 1 sends the packet to the UE 2 and the UE 2 sends the packet to the UE 3 is the broadcast manner and the multicast manner. Therefore, a person skilled in the art knows that the UE 1 is finally connected to more other UEs, to form a plurality of reverse connection links.

Figure 11:
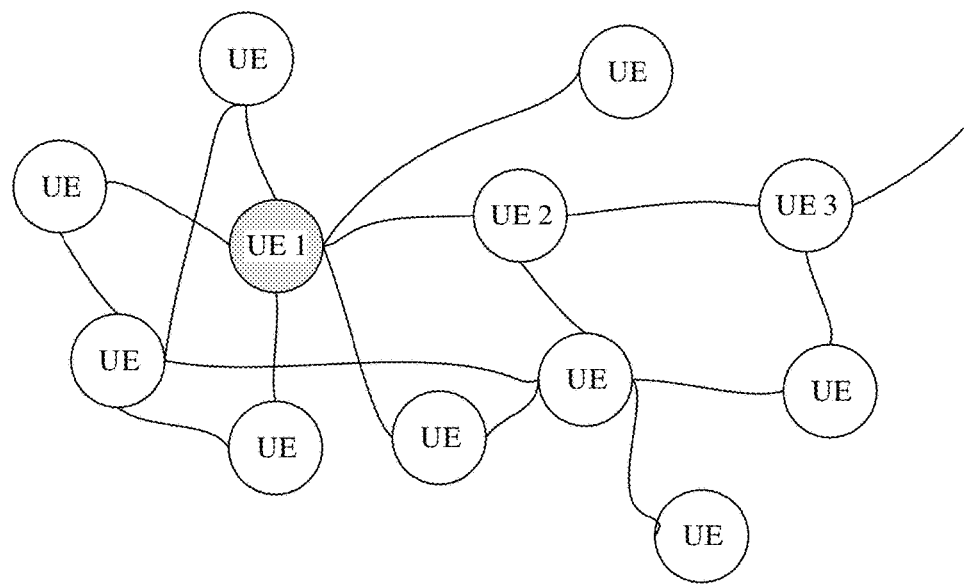
FIG. 11 is a schematic diagram of an SL communication architecture in another UE-to-UE forwarding system according to some embodiments.

For example, in a process in which the UE 1 performs the SL communication, connection links are not limited to the foregoing connection link "UE 1←UE 2←UE 3", but alternatively is that shown in FIG. 11. The UE 1 is connected to more other UEs, to form a plurality of connection links.

In addition, as mentioned above, the manner in which the UE 1 sends the packet and the UE 2 sends the packet is the broadcast or multicast manner. For a process of constructing a reverse routing table, the manners in which the UE 1 sends the packet to the UE 2 and the UE 2 sends the packet to the UE 3 alternatively is a unicast manner. In response to the UE 1 sending a packet to the UE 2 in the unicast manner, the UE 2 is unable to determine whether a reverse routing table is constructed between the UE 2 and the UE 1. Therefore, indication information indicating to construct the reverse routing table further calls to be included in a unicast packet.

Figure 12:
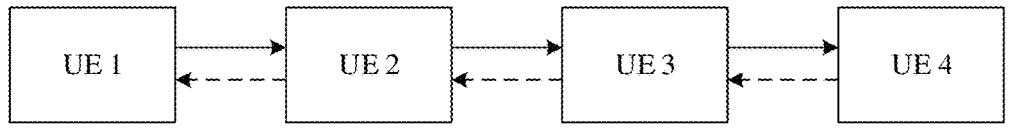
FIG. 12 is a schematic diagram of an SL communication architecture in a UE-to-UE forwarding system according to some embodiments.

FIG. 12 is a schematic diagram of an SL communication architecture in a UE-to-UE forwarding system according to some embodiments. As shown in FIG. 12, in a process in which UE 1 sends data for the first time, in some embodiments, two forwarding UEs are used as an example to describe dual-forward SL communication between the UE 1 and UE 4. The UE 1 is sending UE, UE 2 and UE 3 are forwarding UEs, and the UE 4 is receiving UE. In some embodiments, data routing performed by the UE 1 to the UE 4 is forward SL communication, and data routing performed by the UE 2, the UE 3, and the UE 4 to the UE 1 is reverse SL communication.

For the UE 1, in a process of performing bidirectional SL communication with the UE 4, the UE 1 sends a packet to another UE in a multicast or broadcast manner, to search for the UE 4, and to construct a forward routing table and a reverse routing table between the UE 1 and the UE 4.

In this case, an identifier carried in the packet sent by the UE 1 includes one or more of a PREY identifier, a NEXT identifier, a TGT identifier, and an SRC identifier. The PREY identifier is an identifier of the UE 1, the NEXT identifier is a destination multicast/broadcast identifier, the TGT identifier is an identifier of the UE 4, and the SRC identifier is the identifier of the UE 1.

The UE 2 is one of other UEs to which the UE 1 sends the packet in the multicast or broadcast manner. After receiving the packet, the UE 2 parses the packet. After obtaining the packet, the UE 2 determines, based on the NEXT identifier, whether the packet is sent to the UE 2. After determining that the packet is sent to the UE 2, the UE 2 determines, based on the TGT identifier, whether the UE 2 is final receiving UE. In response to determining that the UE 2 is not the final UE, the UE 2 sends a packet to another UE in the multicast or broadcast manner.

The packet sent by the UE 2 to the another UE is a packet reconstructed by the UE 2, or is a packet obtained by reconfiguring the packet sent by the UE 1 in a manner of setting the PREY identifier from the identifier of the UE 1 to an identifier of the UE 2 and setting the NEXT identifier from the destination multicast/broadcast identifier to a destination multicast/broadcast identifier of the UE 2 (or the NEXT identifier remains unchanged). Then, the packet is sent in the broadcast/multicast manner.

Optionally, the UE 2 determines, based on the TGT identifier, whether the UE 2 has a forward routing table for data routing with the UE 4. in response to the UE 2 having the forward routing table for data routing with the UE 4, the UE 2 sends a feedback packet to the UE 1, so that the UE 1 subsequently constructs a forward routing table with the UE 2.

Optionally, the UE 2 determines, based on the SRC identifier, whether the UE 2 has a reverse routing table for data routing with the UE 1. in response to the UE 2 not having the reverse routing table for data routing with the UE 1, the UE 2 records the one or more of the PREY identifier, the NEXT identifier, the TGT identifier, and the SRC identifier in the received packet.

The UE 3 is one of other UEs to which the UE 2 sends the packet in the multicast or broadcast manner. After receiving the packet, the UE 3 parses the packet. After obtaining the packet, the UE 3 determines, based on the NEXT identifier, whether the packet is sent to the UE 3. After determining that the packet is sent to the UE 3, the UE 3 determines, based on the TGT identifier, whether the UE 3 is the final receiving UE. In response to determining that the UE 2 is not the final UE, the UE 3 sends a packet to another UE in the multicast or broadcast manner.

The packet sent by the UE 3 to the another UE is a packet reconstructed by the UE 3, or is a packet obtained by reconfiguring the packet sent by the UE 2 in a manner of setting the PREY identifier from the identifier of the UE 2 to an identifier of the UE 3 and setting the NEXT identifier from the destination multicast/broadcast identifier to a destination multicast/broadcast identifier of the UE 3. Then, the packet is sent in the broadcast/multicast manner.

Optionally, the UE 3 determines, based on the TGT identifier, whether the UE 3 has a forward routing table for data routing with the UE 4. in response to the UE 3 having the forward routing table for data routing with the UE 4, the UE 3 sends a feedback packet to the UE 2, so that the UE 2 subsequently constructs a forward routing table with the UE 3.

Optionally, the UE 3 determines, based on the SRC identifier, whether the UE 3 has a reverse routing table for data routing with the UE 2. in response to the UE 3 not having the reverse routing table for data routing with the UE 2, the UE 3 records one or more of the PREY identifier, the NEXT identifier, the TGT identifier, and the SRC identifier in the received packet.

The UE 4 is one of other UEs to which the UE 3 sends the packet in the multicast or broadcast manner. After receiving the packet, the UE 4 parses the packet. After obtaining the packet, the UE 4 determines, based on the NEXT identifier, whether the packet is sent to the UE 4. After determining that the packet is sent to the UE 4, the UE 4 determines, based on the TGT identifier, whether the UE 4 is the final receiving UE. In response to determining that the UE 4 is the final UE, the UE 4 determines, based on the SRC identifier, whether the UE 4 has a reverse routing table for data routing with the UE 1, and in response to the UE 4 not having the reverse routing table, constructs the reverse routing table based on the packet.

Optionally, in response to NEXT being in the packet sent by the UE 3 to the UE 4 is the broadcast/multicast identifier, the UE 4 sends a feedback packet to the UE 3. The feedback packet is a packet newly generated by the UE 4, or is a packet obtained by modifying the packet sent by the UE 3. Then, the feedback packet is forwarded to the UE 3. The feedback packet still includes one or more of the PREY identifier, the NEXT identifier, the TGT identifier, and the SRC identifier. In this case, the PREY identifier is the identifier of the UE 4, the NEXT identifier is the identifier of the UE 3, the TGT identifier is the identifier of the UE 1, and the SRC identifier is the identifier of the UE 4.

A time point at which a reverse routing table is constructed is after a time point at which a packet sent by a previous hop is received, or is after a time point at which a feedback message sent by a next hop is received. A detailed example is as follows.

After receiving the feedback packet, the UE 3 constructs a forward route to the UE 4 based on the PREY identifier and the SRC identifier. In addition, in response to the UE 3 not constructing the reverse routing table with the UE 2 before sending the packet in the multicast/broadcast manner, the UE 3 constructs the reverse routing table with the UE 2 based on the recorded PREY identifier in the packet sent by the UE 2 and the TGT identifier in the feedback packet currently received from the UE 4, or constructs the reverse routing table with the UE 2 based on the recorded PREY identifier and SRC identifier in the packet sent by the UE 2. Finally, the UE 3 sends the feedback packet to the UE 2.

Similarly, after receiving the feedback packet, the UE 2 constructs a forward route to the UE 3 based on the PREY identifier and the SRC identifier. In addition, in response to the UE 2 not constructing the reverse routing table with the UE 1 before sending the packet in the multicast/broadcast manner, the UE 2 constructs the reverse routing table with the UE 1 based on the recorded PREY identifier in the packet sent by the UE 1 and the TGT identifier in the feedback packet currently received from the UE 3, or constructs the reverse routing table with the UE 1 based on the recorded PREY identifier and SRC identifier in the packet sent by the UE 1. Finally, the UE 2 sends the feedback packet to the UE 1.

Similarly, after receiving the feedback packet, the UE 1 constructs a forward route to the UE 2 based on the PREY identifier and the SRC identifier.

In some embodiments, in response to SL communication being unable to be implemented between UEs due to a hardware capability, a distance, external interference, or the like, the UE-to-UE forwarding system is introduced. At least one forwarding UE is added between sending UE and receiving UE, and then a forward routing table and a reverse routing table for data transmission between the sending UE and forwarding UE, between forwarding UEs, and between the forwarding UE and the receiving UE is constructed, so that data is mutually transmitted between the sending UE and the receiving UE.

The following describes, from perspectives of routing table change and packet change, the process in which the UE 1 and the UE 4 perform the bidirectional SL communication in some embodiments.

Figure 13:
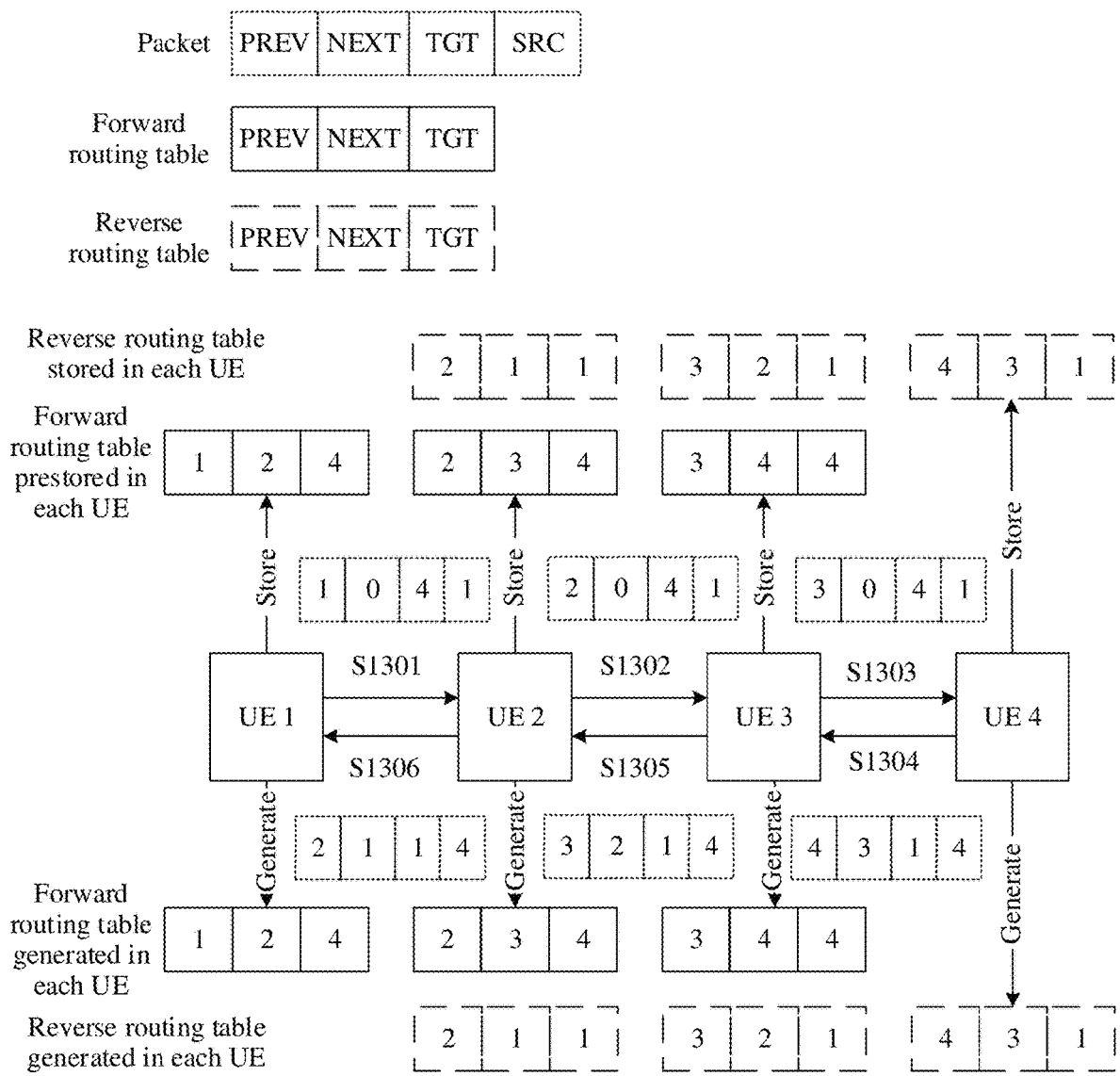
FIG. 13 is a schematic diagram of an architecture of routing table change and packet change in an SL communication process in a UE-to-UE forwarding system according to some embodiments.

FIG. 13 is a schematic diagram of an architecture of routing table change and packet change in an SL communication process in a UE-to-UE forwarding system according to some embodiments. As shown in FIG. 13, two forwarding UEs are still used as an example in some embodiments. UE 1 is sending UE, UE 2 and UE 3 are the forwarding UEs, and UE 4 is receiving UE. In some embodiments, an identifier of the UE 1 is represented by "1", an identifier of the UE 2 is represented by "2", an identifier of the UE 3 is represented by "3", an identifier of the UE 4 or an identifier of the receiving UE is represented by "4", and a destination multicast/broadcast identifier is represented by "0".

For the UE 1, the UE 1 first determines whether the UE 1 has a forward routing table for data routing with the UE 4. The found prestored forward routing table is (PREV: 1, NEXT: 2, TGT: 4) or (NEXT: 2, TGT: 4).

Step S1301: In response to the UE 1 determining that there is no routing table to the UE 4, the UE 1 sends a packet to the UE 2 in a multicast/broadcast manner. Identifiers carried in the packet include [PREV: 1, NEXT: 0, TGT: 4, SRC: 1].

For the UE 2, after receiving the packet sent by the UE 1, the UE 2 queries whether the UE 2 has a forward routing table for data routing with the UE 4. The found prestored forward routing table is (PREV: 2, NEXT: 3, TGT: 4) or (PREV: 2, NEXT: 3, TGT: 4). In addition, the UE 2 further queries whether the UE 2 has a reverse routing table for data routing with the UE 1. In response to the reverse routing table not existing, the reverse routing table is generated. The reverse routing table is (PREV: 2, NEXT: 1, TGT: 1) or (NEXT: 1, TGT: 1).

Step S1302: in response to a determination being made in S1301 that the UE 2 does not have a routing table to the UE 3, the UE 2 sends a packet to the UE 3 in the multicast/broadcast manner. Identifiers carried in the packet include [PREV: 2, NEXT: 0, TGT: 4, SRC: 1].

For the UE 3, after receiving the packet sent by the UE 2, the UE 3 queries whether the UE 3 has a forward routing table for data routing with the UE 4. The found prestored forward routing table is (PREV: 3, NEXT: 4, TGT: 4) or (NEXT: 4, TGT: 4). In addition, the UE 3 further queries whether the UE 3 has a reverse routing table for data routing with the UE 1. In response to the reverse routing table not existing, the reverse routing table is generated. The reverse routing table is (PREV: 3, NEXT: 2, TGT: 1) or (NEXT: 2, TGT: 1).

Step S1303: in response to a determination being made in S1302 that the UE 3 does not have a routing table to the UE 4, the UE 3 sends a packet to the UE 4 in the multicast/broadcast manner. Identifiers carried in the packet include [PREV: 3, NEXT: 0, TGT: 4, SRC: 1].

For the UE 4, after receiving the packet sent by the UE 3, the UE 4 queries whether the UE 4 is final receiving UE. In addition, the UE 4 queries whether the UE 4 has a reverse routing table for data routing with the UE 1, and in response to the UE 4 not having the reverse routing table for data routing with the UE 1, generate the reverse routing table. The reverse routing table is (PREV: 4, NEXT: 3, TGT: 1) or (NEXT: 3, TGT: 1).

Step S1304: In response to the UE 4 determining that the UE 4 is the final receiving UE, because NEXT in the packet sent in step S1303 is the broadcast/multicast identifier, optionally, the UE 4 sends a feedback packet to the UE 3. Identifiers carried in the packet include [PREV: 4, NEXT: 3, TGT: 1, SRC: 4].

For the UE 3, after receiving the packet sent by the UE 4, the UE 3 constructs a forward routing table for data routing with the UE 4. The forward routing table is (PREV: 3, NEXT: 4, TGT: 4) or (NEXT: 4, TGT: 4). in response to no reverse routing table being generated in step S1303, a reverse routing table for data routing with the UE 2 alternatively is constructed. The reverse routing table is (PREV: 3, NEXT: 2, TGT: 1) or (NEXT: 4, TGT: 4).

Step S1305: After the UE 3 determines that the UE 3 performs data routing with the UE 4, because NEXT in the packet sent in step S1302 is the broadcast/multicast identifier, optionally, the UE 3 sends a packet to the UE 2. Identifiers carried in the packet include [PREV: 3, NEXT: 2, TGT: 1, SRC: 4].

For the UE 2, after receiving the packet sent by the UE 3, the UE 2 constructs a forward routing table for data routing with the UE 3. The forward routing table is (PREV: 2, NEXT: 3, TGT: 4) or (NEXT: 3, TGT: 4). in response to no reverse routing table being generated in step S1301, the reverse routing table for data routing with the UE 1 alternatively is constructed. The reverse routing table is (PREV: 2, NEXT: 1, TGT: 1) or (NEXT: 1, TGT: 1).

Step S1306: After the UE 2 determines that the UE 2 performs data routing with the UE 4, because NEXT in the packet sent in step S1301 is the broadcast/multicast identi-fier, optionally, the UE 2 sends a packet to the UE 2. Identifiers carried in the packet include [PREV: 2, NEXT: 1, TGT: 1, SRC: 4].

For the UE 1, after receiving the packet sent by the UE 2, the UE 1 constructs a forward routing table for data routing with the UE 2. The forward routing table is (PREV: 1, NEXT: 2, TGT: 4) or (NEXT: 2, TGT: 4).

In some embodiments, an example in which the UE 1 is the sending UE, the UE 2 and the UE 3 are the forwarding UEs, and the UE 4 is the receiving UE is used. However, according to the foregoing descriptions, manners in which the UE 1 sends the packet to the UE 2, the UE 2 sends the packet to the UE 3, and the UE 3 sends the packet to the UE 4 is the broadcast manner or the multicast manner. Therefore, a person skilled in the art knows that, in a process of establishing the SL communication between the UE 1 and the UE 4, connection links are not limited to the foregoing connection link "UE 1→UE 2→UE 3→UE 4". Alternatively, there is a plurality of connection links between the UE 1 and the UE 4.

The following describes, by using four embodiments, that in a process in which SL communication is performed between sending UE and receiving UE, forwarding UE forwards data in different manners based on different identifiers in the forwarding UE.

Figure 14:
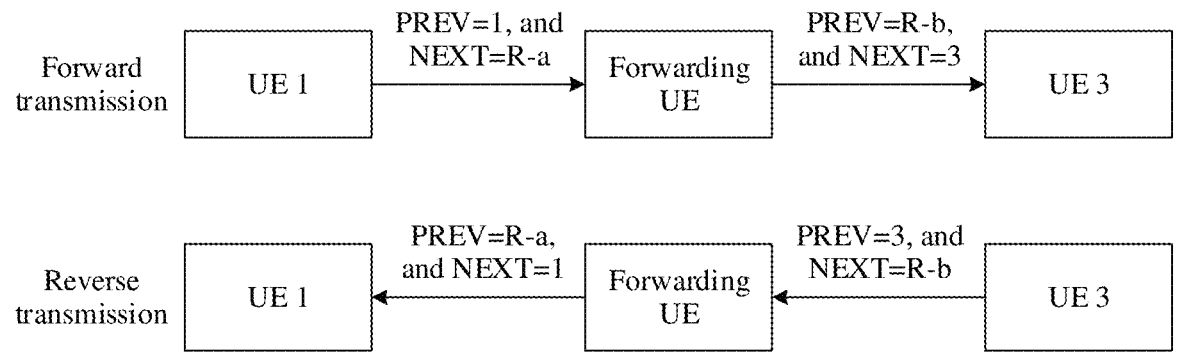
FIG. 14 is a schematic diagram of a data packet processing process according to some embodiments.

Forwarding UE maintains a pair of L2 IDs (which are assumed to be R-a and R-b) for each SL communication connection. An understanding is that a NEXT identifier in a data packet received by the forwarding UE for an SL communication connection is different from a PREV identifier in a data packet forwarded by the forwarding UE. A communication connection established between UE 1 and UE 3 through the forwarding UE is used as an SL communication connection. As shown in FIG. 14, the following is included:

In a forward data transmission process, the forwarding UE receives a data packet (where a PREV identifier is an identifier <PREV=1> of the UE 1 and a NEXT identifier is the identifier <NEXT=R−a> of the forwarding UE) sent by the UE 1 (sending UE), and then forwards the data packet to the UE 3 (receiving UE) (where a PREV identifier is an identifier <PREV=R−b> of the forwarding UE, and a NEXT identifier is an identifier <NEXT=3> of the UE 3).

In a reverse data transmission process, the forwarding UE receives a data packet (where a PREV identifier is an identifier <PREV=3> of the UE 3, and a NEXT identifier is the identifier <NEXT=R−b> of the forwarding UE) sent by the UE 3, and then forwards the data packet to the UE 1 (where a PREV identifier is the identifier <PREV=R−a> of the forwarding UE, and a NEXT identifier is an identifier <NEXT=1> of the UE 1).

Figure 15:
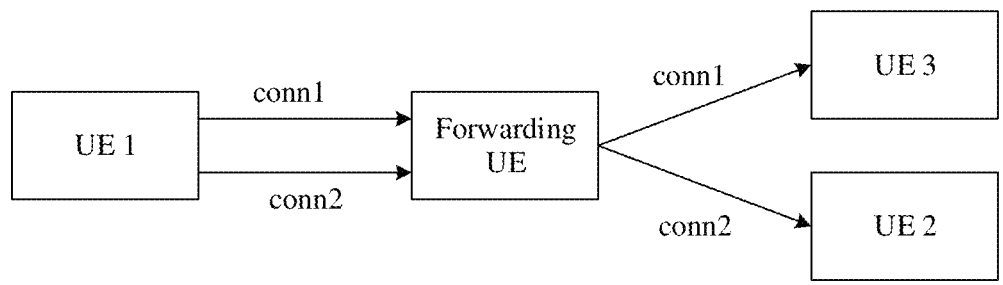
FIG. 15 is a schematic diagram of a data packet forwarding architecture in a UE-to-UE forwarding system according to some embodiments.

For example, a case in which the forwarding UE simultaneously serves a plurality of SL communication connections are that shown in FIG. 15. The forwarding UE serves both an SL communication connection 1 between the UE 1 and the UE 3 and an SL communication connection 2 between the UE 1 and UE 2. In addition, each SL communication connection has one or more SL bearers/logical channels (LCHs) that are used to send data packets of different quality of service (QoS). In some embodiments, the SL communication connection 1 has two LCHs, and the SL communication connection 2 has one LCH. Each LCH corresponds to one RLC entity, but different LCHs of a same connection share one MAC entity. The MAC entity herein maintains a whole set of independent LCHs for different connections in the SL communication. The MAC logical entity is bound to/associated with PREV L2 ID+NEXT L2

ID of both parties in the SL communication, and MAC logical entities in different combinations of PREV L2 ID+NEXT L2 ID are different. There is one or more physical MAC entities for a plurality of MAC logical entities. In some embodiments, PREV L2 ID+NEXT L2 ID identifies an SL connection. UE 1—forwarding UE-UE 3 corresponds to conn1, and UE 1—forwarding UE-UE 2 corresponds to conn2.

The forwarding UE implements mapping of the L2 IDs and conversion between R-a and R-b at a BAP layer.

It is assumed that the UE 1 calls to send a data packet to the UE 3, and a BAP layer of the forwarding UE calls to complete the following two functions, so that data is routed inside the forwarding UE, and after receiving the data from an SL connection and a bearer that correspond to the UE 1, the forwarding UE sends the data through an SL connection and a bearer that correspond to the UE 3. From a perspective of the forwarding UE, the data is received from PREV+ NEXT (UE 1 L2 ID+R_a) and then sent from PREV+NEXT (R_b+UE 3 L2 ID). Therefore, the BAP layer calls to implement the following functions:

1. L2 ID mapping: For example, after receiving the data from the SL connection and the bearer that correspond to the UE 1, the forwarding UE learns, based on a prestored/constructed association relationship, that the data calls to be forwarded to the UE 3. Therefore, the data calls to be mapped to the SL connection and the bearer that correspond to the UE 3. In this case, the forwarding UE obtains, based on a NEXT L2 ID in a received data packet, a PREY L2 ID that calls to be carried in a to-be-sent data packet. In this way, L2 IDs are mapped.

2. L2 ID indication: Optionally, in response to the received data being mapped to the SL connection and the bearer that correspond to the UE 3, the PREY L2 ID carried in the to-be-sent data packet is indicated to another layer (for example, a MAC layer), and/or an L2 ID corresponding to the UE 3 is indicated to another layer (for example, the MAC layer). In response to sending the data packet, a MAC entity fills the PREY L2 ID in a MAC layer header of the data packet as an L2 ID (R_b) allocated by the forwarding UE to the SL connection, and fills the NEXT L2 ID in the corresponding MAC layer header as the UE 3 L2 ID.

In response to the UE 3 calling to send a data packet to the UE 1 through the forwarding UE, a process is similar to the foregoing process, except that the L2 ID maintained by the forwarding UE calls to be changed (for example, reverse conversion between R_a and R_b). Details are not described herein again.

Figure 16:
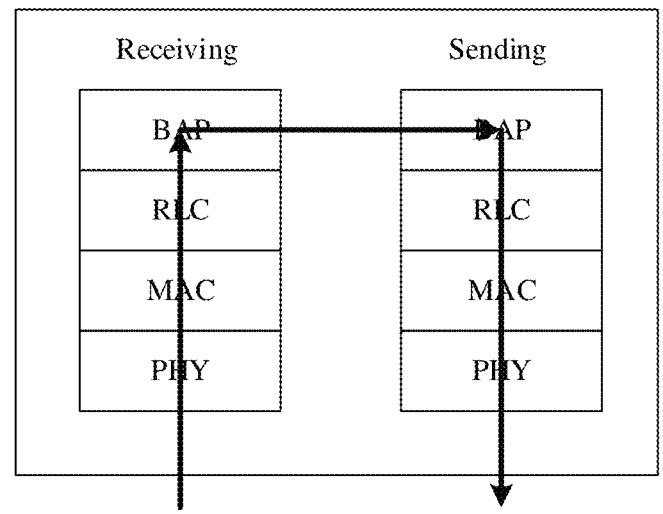
FIG. 16 is a schematic diagram of a forwarding architecture of a data packet in forwarding UE according to some embodiments.

For example, an internal processing process of a data packet in the forwarding UE is that shown in FIG. 16. After receiving a data packet through a receiving bearer (where in this case, a sidelink radio bearer (SL RB) used to receive data refers to an SL RB of L2 forwarding UE, that is, a PDCP layer is unable to be included), the forwarding UE calls to perform layer-by-layer parsing (PHY-→MAC→RLC→BAP), and finally delivers the data packet to a BAP layer. in response to a BAP layer entity determining that the data packet is not a data packet finally sent to the BAP layer entity but a data packet that calls to be forwarded, the BAP entity forwards the data packet through a corresponding sending bearer.

The following uses a BAP model inside the forwarding UE to describe how the forwarding UE forwards a data packet.

Figure 17:
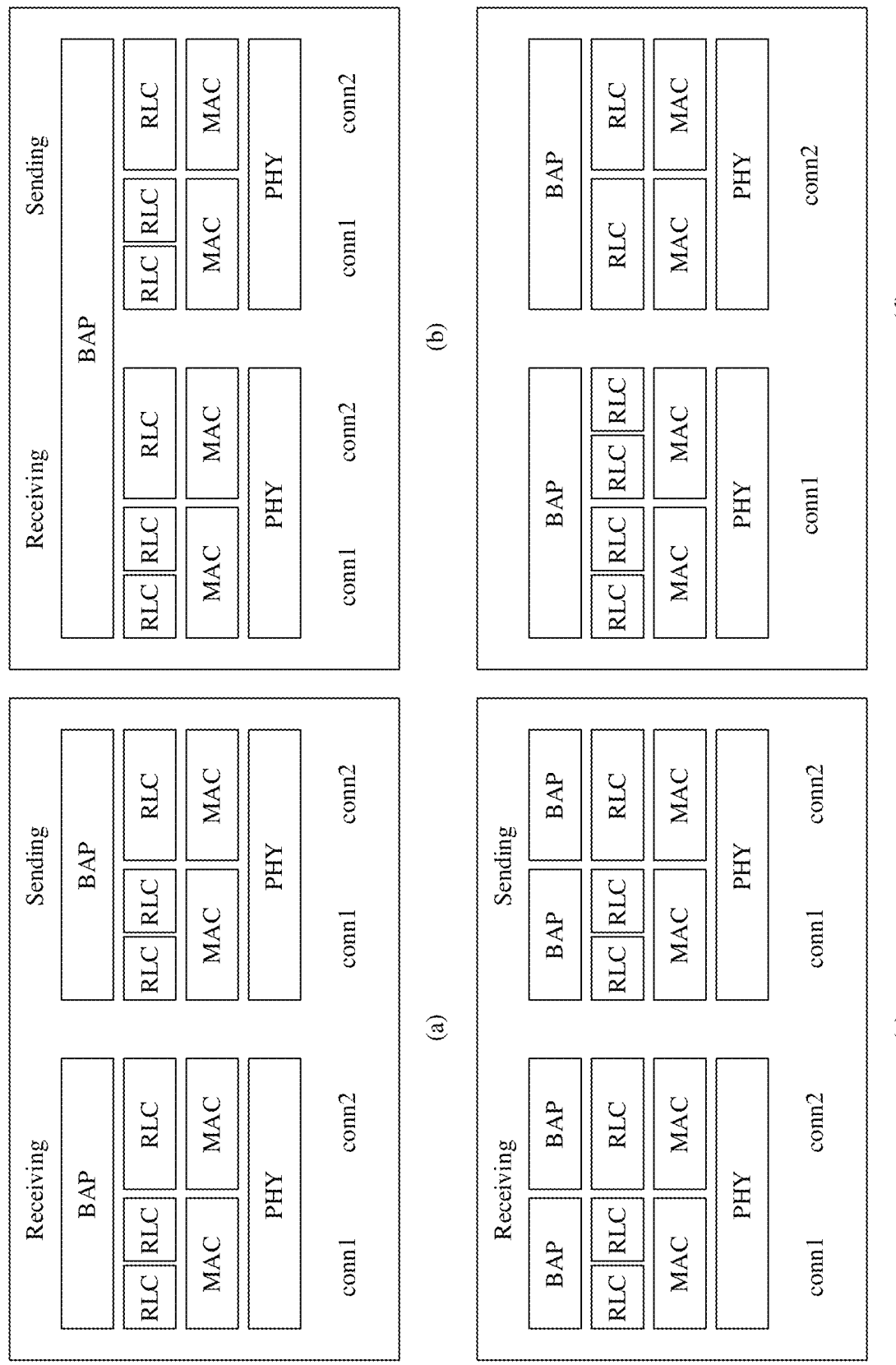
FIG. 17 is a schematic diagram of four models for a BAP layer in forwarding UE according to some embodiments.

1. As shown in FIG. 17(*a*), the forwarding UE includes one receiving BAP entity and one sending BAP entity. For SL communication connections associated with the forwarding UE, a receiving BAP entity is shared to receive data packets and a sending BAP entity is shared to send data packets. In an embodiment, that the UE 1 sends a data packet to the UE 3 is used as an example. After receiving the data packet from the receiving BAP entity, the forwarding UE determines that the data packet calls to be forwarded to the UE 3, and directly delivers the data packet to the internal sending BAP entity. The sending BAP entity forwards the data packet to a corresponding SL connection and a corresponding SL bearer (for example, the sending BAP entity forwards the data packet to the corresponding SL connection and the corresponding SL bearer based on the UE 3 L2 ID).

2. As shown in FIG. 17(*b*), the forwarding UE includes one BAP entity. For SL communication connections, a BAP entity is used to receive and send data packets. In an embodiment, that the UE 1 sends a data packet to the UE 3 is used as an example. Because a BAP entity is shared for receiving/sending for connections, after receiving the data packet, the forwarding UE determines, in the BAP entity, whether to forward the data packet to the UE 3, and forwards the data packet to a corresponding SL connection and a corresponding SL bearer.

3. As shown in FIG. 17(*c*), the forwarding UE includes at least two receiving BAP entities and at least two sending BAP entities. An SL communication connection corresponds to a receiving BAP entity and a sending BAP entity. For an SL communication connection, a data packet is received through a corresponding receiving BAP entity and sent through a corresponding sending BAP entity. In an embodiment, that the UE 1 sends a data packet to the UE 3 is used as an example. Because for each SL connection, there is a corresponding receiving/sending BAP entity for receiving/sending, after receiving the data packet, an SL bearer/an LCH that is of the forwarding UE and that corresponds to the UE 1 delivers the data packet to a receiving BAP entity bound to the bearer at an upper layer. The receiving BAP entity corresponding to the connection calls to determine UE to which the data packet calls to be further forwarded, so that internal routing is performed in a sending BAP entity of a connection corresponding to next-hop UE (the UE 3).

4. As shown in FIG. 17(*d*), the forwarding UE includes at least two BAP entities. For each SL communication connection, a BAP entity is used to receive and send data packets. In an embodiment, that the UE 1 sends a data packet to the UE 3 is used as an example. Because a same BAP entity is used in a same SL communication connection, and different receiving/sending SL bearers (or LCHs) in the connection share the BAP entity, after the forwarding UE receives data, the BAP entity directly routes the data to a sending bearer associated with the same BAP entity for sending, so that the data is routed in the forwarding UE.

In some embodiments, the forwarding UE maintains a pair of L2 IDs for each SL forwarding connection. The BAP layer is added, so that after receiving a data packet, the forwarding UE finds, based on an L2 ID carried in the data packet, an L2 ID paired with the L2 ID and an L2 ID of final receiving UE to which the data packet is to be sent, fills the paired L2 ID and the L2 ID of the final receiving UE in the data packet, and forwards the data packet to the final receiving UE, so that the data packet is forwarded.

The foregoing description is based on an example in which there is the BAP layer model above an RLC layer. Actually, the BAP layer is a logical layer, and exists in any existing protocol layer (for example, an SL physical (PHY) layer/a media access control (MAC) layer/a radio link control (RLC) layer/a packet data convergence protocol (PDCP) layer/a service data adaptation protocol (SDAP)

layer/a radio resource control (RRC) layer/a non-access stratum (NAS) layer/a V2X layer/a PC5-S layer/an APP layer) or a newly described layer.

Figure 18:
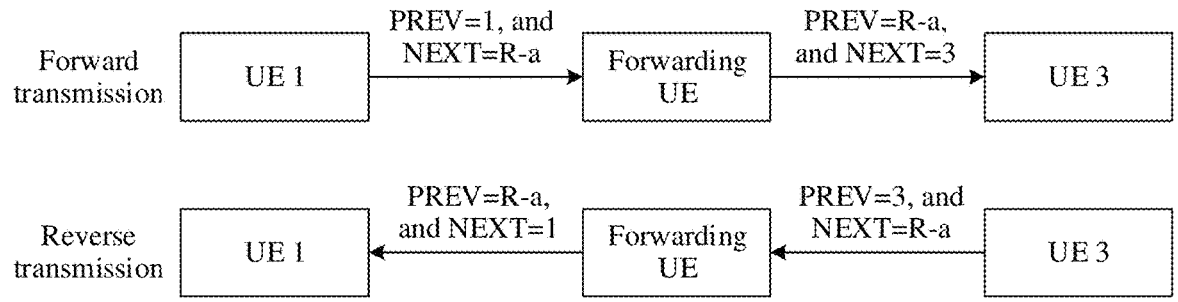
FIG. 18 is a schematic diagram of a data packet processing process according to some embodiments.

Forwarding UE maintains one L2 ID for each SL communication connection. An understanding is that a NEXT identifier in a data packet received by the forwarding UE for an SL communication connection is same as a PREY identifier in a data packet forwarded by the forwarding UE. A communication connection established between UE 1 and UE 3 through the forwarding UE is used as an SL communication connection. As shown in FIG. 18, the following is included:

In a forward data transmission process, the forwarding UE receives a data packet (where a PREY identifier is an identifier <PREV=1> of the UE 1 and a NEXT identifier is the identifier <NEXT=R−a> of the forwarding UE) sent by the UE 1 (sending UE), and then forwards the data packet to the UE 3 (receiving UE) (where a PREV identifier is the identifier <PREV=R−a> of the forwarding UE, and a NEXT identifier is an identifier <NEXT=3> of the UE 3).

In a reverse data transmission process, the forwarding UE receives a data packet (where a PREV identifier is an identifier <PREV=3> of the UE 3, and a NEXT identifier is the identifier <NEXT=R−a> of the forwarding UE) sent by the UE 3, and then forwards the data packet to the UE 1 (where a PREV identifier is the identifier <PREV=R−a> of the forwarding UE, and a NEXT identifier is an identifier <NEXT=1> of the UE 1).

For example, the UE 1 sends data to the UE 3. After receiving a data packet sent by the UE 1, through layer-by-layer parsing, the forwarding UE determines, at a MAC layer, PREV+NEXT identifiers in a MAC layer header of the received data packet. in response to obtained PREV+NEXT identifiers being (UE 1 L2 ID, R_a), the data packet is sent to the forwarding UE. The forwarding UE searches for, based on R_a at a BAP layer, an RLC layer, or another protocol layer, a routing table that is related to R_a, to find a relationship between R_a and an identifier of final receiving UE. For example, R_a or UE 1 L2 ID+R_a corresponds to a UE 3 L2 ID. The forwarding UE fills the PREV+NEXT identifiers as (R_a, UE 3 L2 ID) in the data packet, and finally forwards the data packet to the UE 3. Conversely, in reverse transmission, in response to the UE 3 sending data to the UE 1, in response to the forwarding UE determining that PREV+NEXT identifiers in a MAC layer header of a received data packet are (UE 3 L2 ID, R_a), the data packet is sent to the forwarding UE. The forwarding UE searches for, based on R_a at a BAP layer, an RLC layer, or another protocol layer, a routing table that is related to R_a, to find a relationship between R_a and an identifier of final receiving UE. For example, R_a or UE 3 L2 ID+R_a corresponds to a UE 1 L2 ID. Before forwarding the data packet, the forwarding UE fills the PREV+NEXT identifiers as (R_a, UE 1 L2 ID) in the data packet, and then sends the data packet to the UE 1. According to this solution, the forwarding UE determines, based on {PREY ID+NEXT ID} carried in a data packet received from a previous-hop node (for example, the UE 1), an identifier of next-hop UE (for example, the UE 3).

Figure 19:
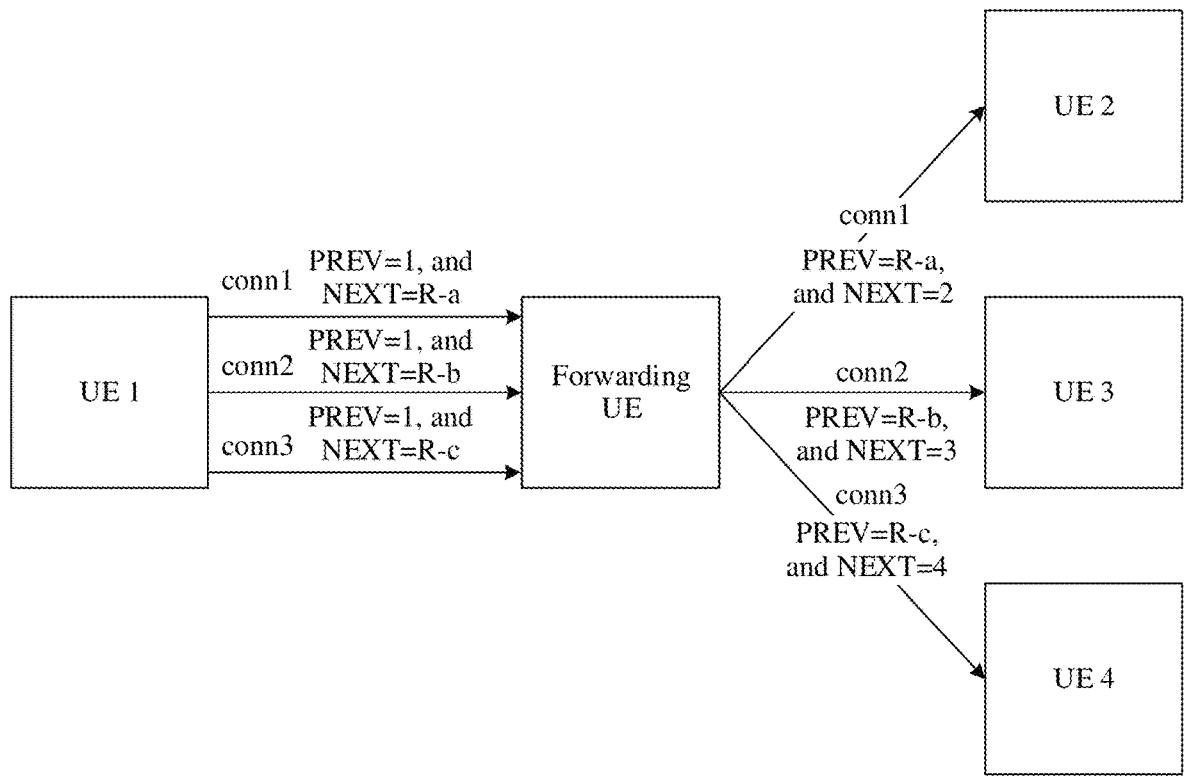
FIG. 19 is a schematic diagram of a data packet forwarding architecture in a UE-to-UE forwarding system according to some embodiments.

For example, FIG. 19 shows a case in which one sending UE sends data packets to a plurality of receiving UEs through forwarding UE. In some embodiments, the UE 1 calls to perform SL communication with of UE 2, the UE 3, and UE 4 through same forwarding UE. In this case, an L2 ID allocated by the forwarding UE to a forwarding connection between the UE 1 and the UE 2 is R_a. An L2 ID allocated by the forwarding UE to a forwarding connection between the UE 1 and the UE 3 is R_b. An L2 ID allocated by the forwarding UE to a forwarding connection between the UE 1 and the UE 4 is R_c. The forwarding UE allocates different L2 IDs to different forwarding connections. Therefore, the forwarding UE distinguishes, based on the different L2 IDs allocated by the forwarding UE to the different forwarding connections, UE (the UE 2/the UE 3/the UE 4) to which data received from the UE 1 is forwarded or that data forwarded to the UE 1 is received from the UE 2/the UE 3/the UE 4. As a result, disorder does not occur in response to the forwarding UE performing data transmission in a plurality of SL communication connections.

In addition, for how to forward a data packet in the forwarding UE in some embodiments, refer to the descriptions of the four models in FIG. 17 in some embodiments. Details are not described again in some embodiments.

Compared with some embodiments in which the forwarding UE calls to maintain two L2 IDs for each SL communication connection, in some embodiments, the forwarding UE calls to maintain one L2 ID for each SL communication connection. The forwarding UE obtains, with reference to the NEXT identifier or the PREV+NEXT identifiers in the received data packet, the NEXT identifier for further forwarding the data packet, to implement data routing and forwarding between the sending UE and the receiving UE. This not reduces a quantity of L2 IDs maintained by the forwarding UE, but also avoids conversion between R_a and R_b for the forwarding UE in a process of forwarding the data packet.

There are two manners for determining the identifier of the next-hop UE. In one manner, the forwarding UE searches for a corresponding routing table based on the NEXT identifier in the received data packet, and then determines the identifier of the next-hop UE based on the routing table. In the other manner, the forwarding UE searches for a corresponding routing table based on the PREY identifier and the NEXT identifier in the received data packet, to determine the identifier of the next-hop UE (where the PREY identifier is used to prevent the forwarding UE from forwarding again the data packet to the UE that sends the data packet).

Figure 20:
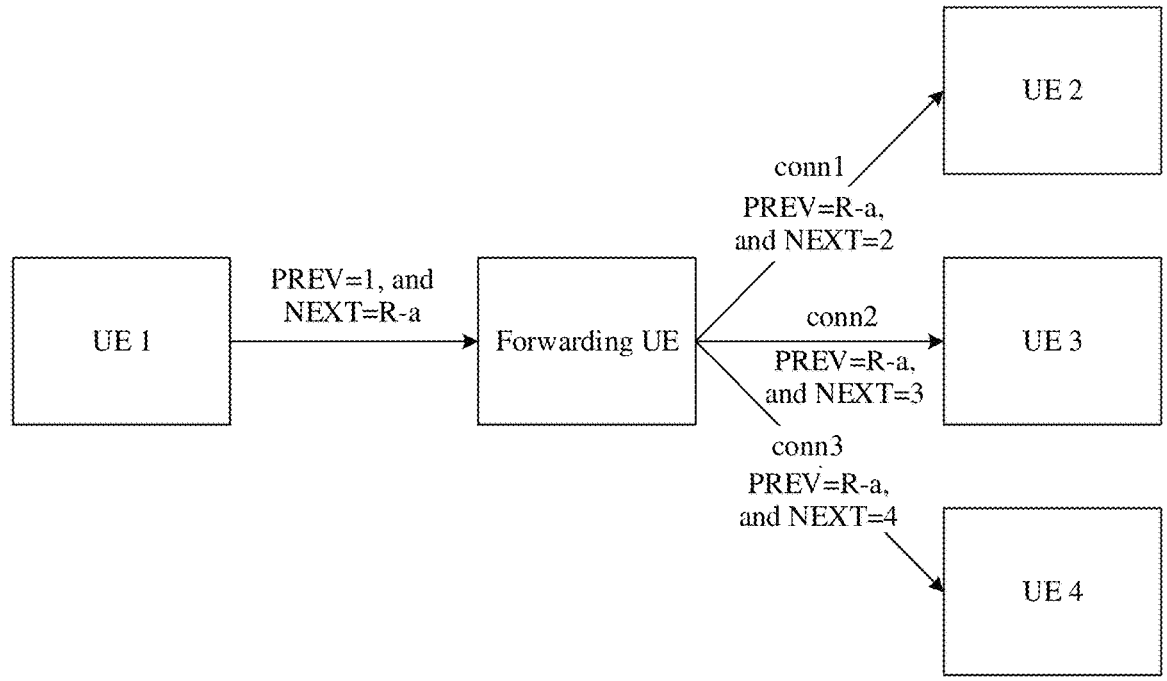
FIG. 20 is a schematic diagram of a data packet forwarding architecture in a UE-to-UE forwarding system according to some embodiments.

Forwarding UE maintains one L2 ID for SL communication connections. An understanding is that a NEXT identifier in a data packet received by the forwarding UE for SL communication connections is same as a PREY identifier in a data packet forwarded by the forwarding UE. A process in which the forwarding UE implements data routing and forwarding between sending UE and a plurality of receiving UEs is shown in FIG. 20.

1. For data transmission between the forwarding UE and UE 2/UE 3/UE 4:

(1) In a process in which the forwarding UE receives a data packet, in response to the UE 2/the UE 3/the UE 4 sending a data packet to the forwarding UE, the forwarding UE easily determines, based on a PREY identifier carried in the data packet, UE from which the data packet comes.

(2) In a process in which the forwarding UE sends a data packet, after receiving a data packet from UE 1, the forwarding UE is unable to determine, based on R_a carried in the data packet, UE to which the data packet is forwarded. Therefore, a BAP layer calls to be added. The forwarding UE determines a destination TGT of the data packet based on TGT identification information in a BAP layer header of the data packet, and then determine, based on a routing table, a NEXT identifier corresponding to the TGT, to determine next-hop UE to which data is to be sent. The forwarding UE forwards the data packet to corresponding receiving UE through the next-hop UE.

2. For data transmission between the forwarding UE and the UE 1 (because a data packet sent by the forwarding UE to the UE 1 is sent from the UE 2/the UE 3/the UE 4, a source of the data packet calls to be identified, or in response to a data packet being sent to the UE 2/the UE 3/the UE 4, a source of the data packet calls to be identified; therefore, the BAP layer calls to be added to the forwarding UE):

(1) In a process in which the forwarding UE sends a data packet, after receiving a data packet from the UE 2/the UE 3/the UE 4, the forwarding UE identifies, based on R_a carried in the data packet, that the data packet is finally routed to the UE 1, and then forwards the data packet to the UE 1.

(2) In a process in which the forwarding UE receives a data packet, after receiving a data packet sent by the UE 1, the forwarding UE is unable to determine, based on R_a carried in the data packet, UE to which the data packet is forwarded. Therefore, the BAP layer calls to be added. The forwarding UE determines a destination TGT of the data packet based on TGT identification information in a BAP layer header of the data packet.

In conclusion, whether the BAP layer calls to be added to the forwarding UE is determined based on a situation. A manner of dynamically determining, by the forwarding UE, whether the BAP layer calls to be added is as follows: In response to one sending UE sending a data packet to a plurality of receiving UEs through the same forwarding UE, the BAP layer calls to be added, to identify a TGT identifier in the data packet. Then, a corresponding routing table is determined based on the TGT identifier, and next-hop UE is finally determined based on a NEXT identifier in the routing table.

Whether the BAP layer calls to be added to the forwarding UE is determined by the forwarding UE or the sending UE. Optionally, an identifier of the BAP layer is allocated by the forwarding UE or the sending UE. Details are as follows.

If the identifier of the BAP layer is determined by the sending UE, in response to constructing a data packet, the sending UE adds a BAP layer header to the data packet and includes a BAP identifier (namely, a TGT identifier).

In another embodiment, the data packet further carries indication information, and the indication information indicates whether the data packet carries the BAP layer header. For example, the indication information is further carried at an RLC layer of the data packet, to indicate that the data packet includes the BAP layer. Because the forwarding UE receives a data packet with the BAP layer header, or receives a data packet without the BAP layer header, whether the data packet includes the BAP layer header calls to be indicated at a layer (for example, the RLC layer) below the BAP layer.

For example, in response to the indication information being carried at the RLC layer of the data packet, after receiving the data packet, the forwarding UE performs layer-by-layer parsing, and obtains the indication information in response to parsing the RLC layer. Then, after determining, based on the indication information, that the data packet includes the BAP layer header, the forwarding UE performs BAP layer parsing to obtain the TGT identifier, queries the corresponding routing table based on the TGT identifier, and then determines, based on the corresponding NEXT identifier in the routing table obtained through querying, the next-hop UE that receives the data packet.

If the identifier of the BAP layer is determined by the forwarding UE, after receiving a packet sent by the sending UE and determining that the forwarding UE performs data routing with final receiving UE, the forwarding UE sends a feedback packet to the sending UE. A BAP layer header is added to the feedback packet, and the feedback packet carries a BAP identifier allocated by the forwarding UE to the final receiving UE, so that in response to the sending UE subsequently calling to send data to the UE 2/the UE 3/the UE 4, different BAP identifiers allocated by the forwarding UE are separately carried. After receiving the data packet from the UE 1, the forwarding UE learns, based on the carried BAP identifier, that the data packet is to be subsequently sent to the UE 2, the UE 3, or the UE 4, to separately send the data packet to different UEs (for example, a PREY identifier carried in a MAC header of the forwarded data packet is an identifier of the forwarding UE, and a NEXT identifier is an identifier of the final receiving UE, for example, an identifier of the UE 2/the UE 3/the UE 4). Optionally, in response to receiving the BAP identifier allocated by the forwarding UE, the sending UE further calls to obtain the identifier of the UE 2/the UE 3/the UE 4. The identifier is an APP ID or an L2 ID of the UE 2/the UE 3/the UE 4. The identifier is carried in the feedback packet. Optionally, in response to the UE 1 calling to send a data packet to the UE 2/the UE 3/the UE 4, each data packet delivered by an upper layer to an access stratum (AS) calls to carry the identifier of the final receiving UE (TGT UE), and the identifier of the final receiving UE is an APP ID or an L2 ID of the final receiving UE.

If the data packet sent by the UE 1 to the forwarding UE does not have the BAP layer header, the BAP layer is initially configured for the UE 1 and the forwarding UE on a control plane. However, in this case, the BAP layer header of the data packet does not call to carry the BAP identifier, or the BAP identifier is subsequently allocated on a user plane or the control plane.

A constructed data packet meets at least one of the following:

(1) The BAP layer header is added to the data packet, and the data packet carries a BAP UE ID (for the TGT UE).

(2) The RLC layer of the data packet includes the indication information indicating that there is the BAP layer. Because the forwarding UE receives a data packet with the BAP layer header, or receives a data packet without the BAP layer header, whether the data packet includes the BAP layer header calls to be explicitly/implicitly indicated by using the layer (for example, the RLC layer) below the BAP layer.

(3) The forwarding UE knows, based on the BAP UE ID (for the TGT UE) included by the sending UE, that the data packet is finally routed to the UE 3 instead of the UE 2 or the UE 4.

(4) Conversely, the forwarding UE alternatively multiplexes data sent by the UE 2/the UE 3/the UE 4 to the UE 1, and send the data to the UE 1.

The following describes the first constructed packet (how the forwarding UE allocates BAP UE IDs):

(1) The forwarding UE adds the BAP layer header to the first packet returned to the UE 1, and includes a BAP UE ID allocated by the forwarding UE, so that in response to subsequently sending data to the UE 2/the UE 3/the UE 4, the UE 1 respectively fills different BAP UE IDs allocated by the forwarding UE. After receiving a data packet, the forwarding UE learns, based on a carried BAP UE ID, whether the data packet is subsequently forwarded to the UE 2, the UE 3, or the UE 4. In this way, data packets are respectively sent to different UEs (where in MAC headers of the forwarded data packets, PREY L2 IDs are filled as an L2 ID of the forwarding UE, and NEXT L2 IDs are respectively filled as L2 IDs of final receiving UEs, for example, the L2 ID of the UE 2/the UE 3/the UE 4). Therefore, in response to receiving the BAP UE ID allocated by the forwarding UE, the UE 1 also calls to obtain the identifier of the UE 2/the UE 3/the UE 4, where the identifier is the APP ID or the L2 ID of the UE 2/the UE 3/the UE 4. In response to the corresponding UE 1 calling to send the data packet to the UE 2/the UE 3/the UE 4, each data packet delivered by the upper layer to the AS layer calls to carry an identifier of target UE, and the identifier of the target UE is an APP ID or an L2 ID of the UE.

(2) in response to the data packet between the UE 1 and the forwarding UE not having the BAP layer header at the beginning, the BAP layer is initially configured for the UE 1 and the forwarding UE on the control plane. However, in this case, the BAP layer header does not carry the BAP UE ID, or the BAP UE ID is subsequently allocated on the user plane or the control plane.

(3) In response to the forwarding UE receiving response messages of the UE 2, the UE 3, and the UE 4, the response messages are encapsulated and sent together (because for the messages: PREY L2 ID=R_a and NEXT L2 ID=1). Alternatively, the response messages is unable to be encapsulated together. There is two sending manners.

opt1: Multiplexing is not allowed. The first received response packet carrying a UE APP ID of the UE 2, the first received response packet carrying a UE APP ID of the UE 3, and the first received response packet carrying a UE APP ID of the UE 4 is unable to be encapsulated into one data packet for transmission to the UE 1.

opt2: Multiplexing is allowed. However, packets transparently transmitted by the forwarding UE call to be encapsulated as independent IEs, and carry a plurality of allocated BAP IDs in sequence. The packets and the BAP IDs are in one-to-one correspondence. For example, sorting and encapsulation is performed based on an order of the IDs. Alternatively, the plurality of BAP IDs are respectively mapped to corresponding locations in the packets, and then encapsulated. For example, the following plurality of independent packets are uniformly encapsulated into one packet or transport block (TB) for sending: A response packet of the UE 2 carries {UE 2 APP ID, BAP UE ID=2}; a response packet of the UE 3 carries {UE 3 APP ID, BAP UE ID=3}; and a response packet of the UE 4 carries {UE 4 APP ID, BAP UE ID=4}.

The receiving UE (the UE 1) performs mapping depending on whether the received packet carries the BAP layer. In response to the packet not carrying the BAP layer, the receiving UE (the UE 1) maps/distinguishes between UEs based on other L2 IDs or L1 IDs. in response to the packet carrying the BAP layer, the receiving UE (the UE 1) maps/distinguishes between UEs based on BAP UE IDs.

Figure 21:
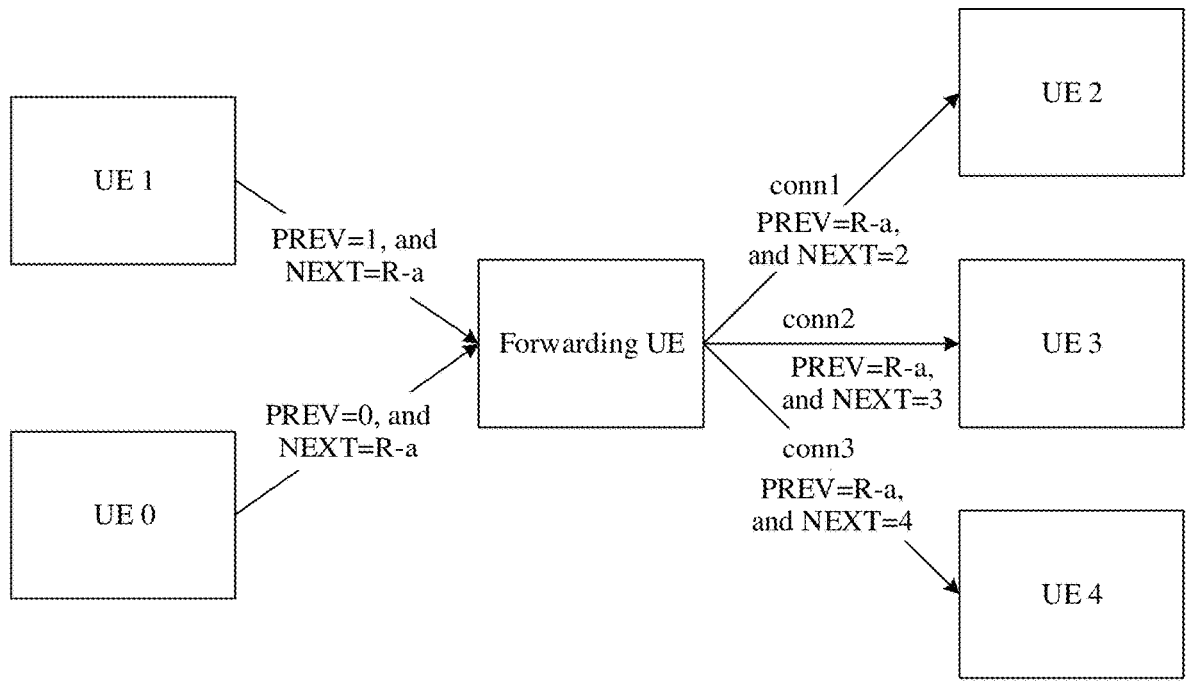
FIG. 21 is a schematic diagram of a data packet forwarding architecture in another UE-to-UE forwarding system according to some embodiments.

For example, FIG. 21 shows a case in which a plurality of sending UEs send data packets to a plurality of receiving UEs through forwarding UE. Based on the solution in FIG. 20, UE 0 also performs SL communication with the UE 3 through the forwarding UE. Therefore, in a communication process between the forwarding UE and the receiving UE, in response to receiving a data packet to be forwarded to the UE 3, the forwarding UE also calls to include a BAP layer header. In addition, a BAP identifier calls to be carried in the BAP header to indicate UE that sends data to the UE 3. For example, in response to the forwarding UE determining, based on PREY L2 ID+NEXT L2 ID in the received data packet, that the data is sent by the UE 1 to the UE 3, an identifier of the UE 1 is carried in the data packet forwarded to the UE 3. The identifier of the UE 1 is a PREY L2 ID in the data packet received by the forwarding UE.

In some embodiments, in a scenario in which the forwarding UE maintains a common L2 ID for SL connections, the added BAP layer and information carried in the BAP layer header ensure that data routing and forwarding between the sending UE and the receiving UE is performed normally. Compared with some embodiments in which one L2 ID is maintained for each SL communication, a quantity of L2 IDs maintained by the forwarding UE is further reduced and a probability of an L2 ID conflict is reduced.

In some embodiments, the forwarding UE maintains one L2 ID for SL communication. However, the BAP layer calls to be dynamically added, and BAP identifiers call to be allocated and maintained. Consequently, this solution is excessively complex to use. Therefore, the foregoing embodiment is a simpler solution, that is, the BAP layer carries the BAP identifier (where there is no call to flexibly determine in response to the BAP identifier being carried or not). Optionally, allocation of the BAP identifiers is unable to be called for, and an L2 ID of final receiving UE calls to be carried at the BAP layer.

Figure 22:
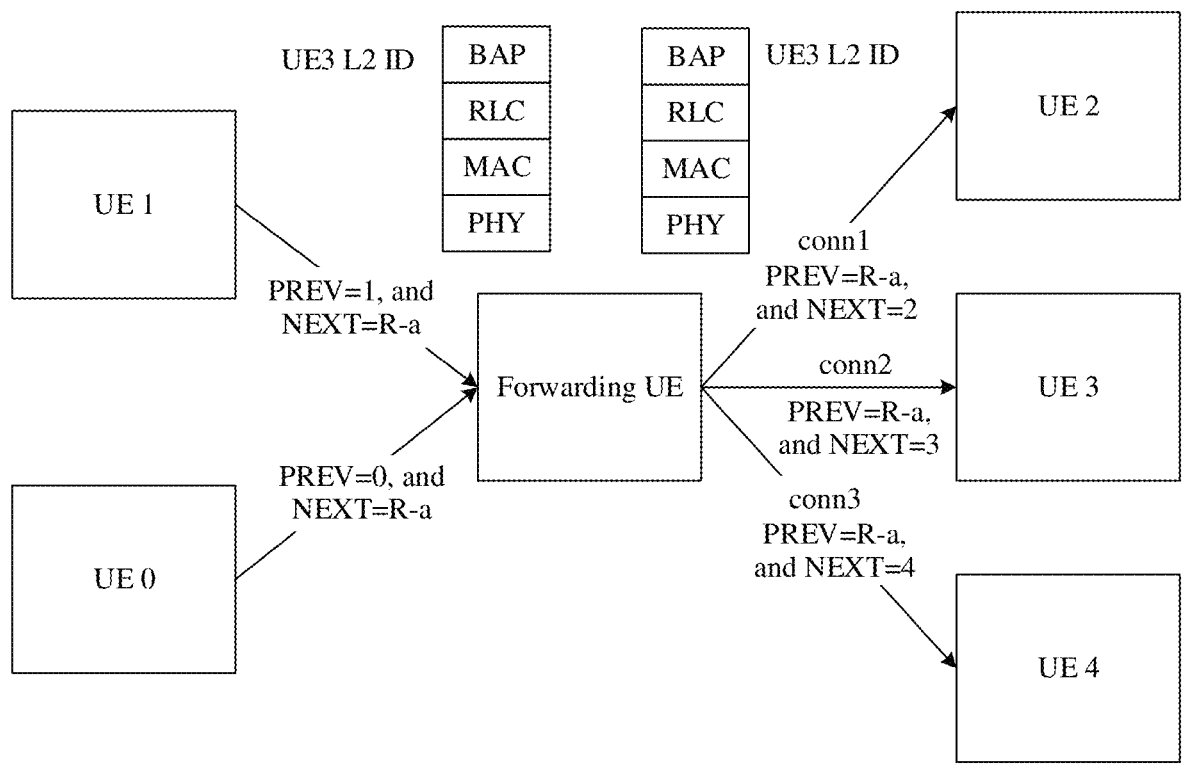
FIG. 22 is a schematic diagram of a data packet forwarding architecture in a UE-to-UE forwarding system according to some embodiments.

For example, as shown in FIG. 22, a process in which sending UE (UE 1) sends data (where a data packet carries a PREY identifier, a NEXT identifier, a TGT identifier, and/or an SRC identifier) to receiving UE (UE 3) is as follows.

1. For the data packet sent by the UE 1 to forwarding UE, in a MAC layer header of the data packet, the PREY identifier is filled as a UE 1 L2 ID, and the NEXT identifier is filled as a forwarding UE L2 ID; and in a BAP layer header, a TGT identifier is filled as a UE 3 L2 ID and/or the SRC identifier is filled as the UE 1 L2 ID.

2. The forwarding UE processes the data packet.

(1) The forwarding UE performs layer-by-layer parsing on the data packet. In the received MAC layer header, in response to the NEXT identifier being equal to an L2 ID of the forwarding UE, the forwarding UE considers that the data packet is data sent to the forwarding UE, calls to further parse and unpack the data packet level by level, and finally delivers the data packet to a BAP layer of the forwarding UE.

(2) The BAP layer determines whether the TGT identifier filled in the BAP layer header is an identifier of the forwarding UE, and in response to the TGT identifier filled in the BAP layer header not being the identifier of the forwarding UE, the forwarding UE determines that the data calls to be forwarded. The BAP layer forwards the data packet to a transmitting end of the forwarding UE. Optionally, the BAP layer sends the TGT identifier to a lower layer (for example, an RLC layer or a MAC layer) of the BAP layer.

(3) At the transmitting end of the forwarding UE, the TGT identifier filled in the BAP layer header remains unchanged, that is, the TGT identifier is still the UE 3 L2 ID.

(4) The MAC layer searches for a routing table based on the UE 3 L2 ID sent by the BAP layer to obtain a next-hop node and a corresponding L2 ID. Alternatively, the BAP layer searches for a routing table and notifies the MAC layer of an L2 ID of next-hop UE. For example, the next hop in this embodiment is the UE 3. In the MAC layer header, the PREY identifier is filled as the L2 ID of the forwarding UE, and the NEXT identifier is filled as the L2 ID of the next hop (which is the UE 3 L2 ID herein, but is the L2 ID of the next-hop node instead of the UE 3 L2 ID in response to a plurality of hops being supported).

3. After receiving the data packet, the UE 3 performs processing. The UE 3 reads the NEXT identifier in the MAC layer header of the data packet. In response to the identifier being the L2 ID of the UE 3, the UE 3 preliminarily considers that the data packet is sent to the UE 3. Therefore, the UE 3 decapsulates the data packet level by level and finally sends the data packet to a BAP layer. The BAP layer of the UE 3 finds that a BAP layer identifier carried at the BAP layer is an identifier of the UE 3 (for example, the UE 3 L2 ID), the UE 3 finally considers that the data packet is sent to the UE 3, and finally delivers the data packet to an upper layer (for example, a PDCP layer/an RRC layer/an SDAP layer/a V2X layer/a NAS layer/an APP layer) for processing.

Figure 23:
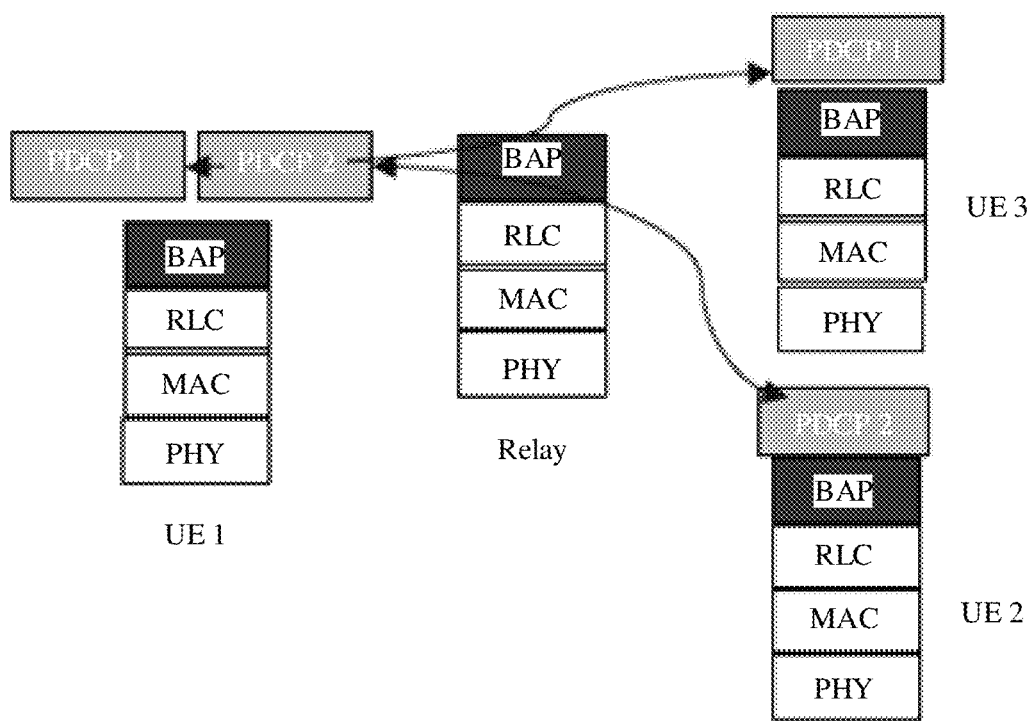
FIG. 23 is a schematic diagram of an architecture in which a data packet is transmitted in each PDCP entity in an SL communication connection according to some embodiments.

The forwarding UE maintains one L2 ID for SL communication connections, has the BAP layer, and includes an identifier of initial sending UE (for example, a sending UE L2 ID). After receiving a data packet, UE at a final receiving end delivers the data packet to a corresponding PDCP entity. One RLC bearer corresponds to a plurality of PDCP entities, and each PDCP entity corresponds to a PDCP entity jointly maintained by sending UE and receiving UE (because an RLC entity is maintained hop by hop, the PDCP entity is maintained in an end-to-end manner, and a PDCP serial number (serial number, SN) is also maintained per PDCP entity). For example, as shown in FIG. 23, in response to UE 1 communicating with both of UE 2 and UE 3 through forwarding UE (a relay), the UE 3 and the UE 2 call to send data to the UE 1. After receiving a data packet and delivering the data packet to an RLC entity, the UE 1 calls to determine whether the data packet is sent to a PDCP entity 1 or a PDCP entity 2 in an upper level. In addition, optionally, the forwarding UE further includes at least one of an identifier (for example, a sending UE L2 ID) of the initial sending UE 1, an SL link identifier (for example, a link ID), SL bearer information or an SL bearer identifier, logical channel information or a logical channel identifier, and quality of service QoS information or a QoS identifier. Therefore, after receiving a data packet, final receiving UE delivers, based on the foregoing information, the data packet to a correct PDCP entity/SDAP entity/RRC entity or the like, for example, by using one connection identifier that is of each PDCP entity and that is maintained by the final receiving UE. A connection is uniquely bound/associated/identified by using an SRC ID and a TGT ID carried in a packet.

In some embodiments, the forwarding UE maintains one L2 ID for SL communication connections, has the BAP layer, and includes an identifier (for example, an L2 ID, an L1 ID, a MAC address, or an IP address) of the final receiving UE, to implement data routing and forwarding between the sending UE and the receiving UE.

Similarly, the foregoing description is based on an example in which there is a BAP layer model above an RLC layer. Actually, the BAP layer is a logical layer, and exists in any existing protocol layer (for example, an SL PHY layer/a MAC layer/an RLC layer/a PDCP layer/an SDAP layer/an RRC layer/a NAS layer/a V2X layer/a PC5-S layer/an APP layer) or a newly described layer.

The foregoing embodiments are used in not a UE-UE forwarding scenario but also a UE-network forwarding scenario. In this case, a Uu interface between forwarding UE and a base station is replaced with an SL segment in the SL communication connection in the foregoing embodiments. Therefore, the UE-network forwarding scenario is considered as a special case of a UE-UE forwarding system.

Alternatively, the UE is a network device node, for example, a network element node such as an eNB/a gNB/a control unit (CU)/a distributed unit (DU)/an access and mobility management function network element (AMF)/a user plane function (UPF)/an element management system (EMS)/a network management system (NMS)/an operations, administration, and maintenance (OAM) network element node. A communication interface further is applicable to an interface (for example, an SL interface) between UEs, an interface (for example, a Uu interface) between UE and a RAN network device, and an interface between devices (for example, an Xn interface between stations/an Ng interface between network elements/an F1 interface between the CU and the DU).

For example, in the UE-to-network forwarding scenario, a RAN device node (such as the gNB, the CU, or the DU) further is considered as a UE node. A UE 1→UE 2→UE 3→gNB scenario is used as an example. The UE 1 expects to find a node for accessing the Internet, and sets a TGT node in a packet sent to another node as a node identifier of the gNB. The identifier is predetermined in a protocol (for example, predefined as "0000"), preset in sending UE (the UE 1), or notified to forwarding UE by using a message such as a system information block (system information block, SIB)/an RRC/a NAS message and forwarded by the forwarding UE to the sending UE (the UE 1). The broadcast/multicast packet used for establishing a routing table described above is not transmitted through an SL interface in response to the packet being transmitted between the UE 3 and the gNB, but is transmitted through a Uu interface. A carried identifier is also similar to the identifier carried in the foregoing packet, for example, includes one or more of a PREY identifier, a NEXT identifier, an SRC identifier, and a TGT identifier.

After a routing table is established, data communication is used as an example for description.

1. Uplink:

(1) The UE 1 sends a data packet to the gNB. Similar to the foregoing solution, data is transmitted through the SL interface, and one or more of the PREY identifier, the NEXT identifier, the SRC identifier, and the TGT identifier are included.

(2) After receiving the data packet sent by the UE 1, the UE 2 determines that the TGT identifier is finally to be sent to the gNB, and therefore determines, by searching for the routing table, that a next hop is the UE 3. Therefore, the UE 2 also sends/forwards the data packet through the SL interface, where the data packet carries {PREV=2, NEXT=3, TGT=0000, SRC=1}.

(3) After receiving the data packet sent/forwarded by the UE 2, the UE 3 determines that the TGT identifier is finally to be sent to the gNB, and therefore determines, by searching for the routing table, that a next hop is the gNB. Therefore, the UE 3 sends/forwards the data packet through the Uu interface, where the data packet carries {PREV=3, NEXT=0000, TGT=0000, SRC=1}.

(4) After receiving the data packet sent/forwarded by the UE 3, the gNB learns, based on SRC=1, that the data packet is sent by the UE 1, and further processes the data packet, for example, forwards the data packet to a CN, optionally identifies that data comes from the UE 1, and transmits the data packet based on a tunneling protocol (GPRS tunneling protocol, GTP) corresponding to the UE 1.

2. Downlink:

(1) After receiving a data packet from the CN (for example, the UPF), the gNB learns that the data packet is finally to be sent to the UE 1, and learns, by searching for the routing table of the gNB, that a next hop is the UE 3. Therefore, the gNB sends/forwards the data packet through the Uu interface, where the data packet carries {PREV=0000, NEXT=3, TGT=1, SRC=0000} in an explicit/implicit manner. For example, the PREV identifier and/or the SRC identifier is omitted. The UE 3 learns, from the data packet received from the Uu interface, that the PREV identifier and the SRC identifier are sent by a gNB corresponding to 0000, and adds corresponding identification information to the SL interface during subsequent further sending/forwarding. The NEXT identifier further is implicitly carried, for example, is identified by using a C-RNTI corresponding to the UE 3, and the UE 3 learns, by parsing the C-RNTI, that the data packet is sent to the UE 3 or the data packet is a data packet of interest (where the data packet calls to be received and further forwarded to the UE 1).

(2) After receiving a downlink data packet from the gNB, the UE 3 searches for the routing table based on TGT=1 and learns that a next hop is the UE 2, and further forwards the downlink data packet through the SL interface, where the data packet carries {PREV=3, NEXT=2, TGT=1, SRC=0000}.

(3) Similarly, after receiving the data packet sent/forwarded by the UE 3 through the SL, the UE 2 sends/forwards the data packet through the SL. The UE 2 learns, after searching for the routing table, that a next hop of TGT=1 is the UE 1, and further forwards the data packet through the SL interface, where the data packet carries {PREV=2, NEXT=1, TGT=1, SRC=0000}.

(4) After receiving the SL data packet sent/forwarded by the UE 2 and parsing the NEXT identifier and the TGT identifier, the UE 1 learns that the SL data packet is sent to the UE 1, and therefore sends the SL data packet to an upper layer for further processing.

In some embodiments, the packet and the data packet carries information such as the PREV identifier, the NEXT identifier, the TGT identifier, and the SRC identifier in the implicit or explicit manner.

Figure 24:
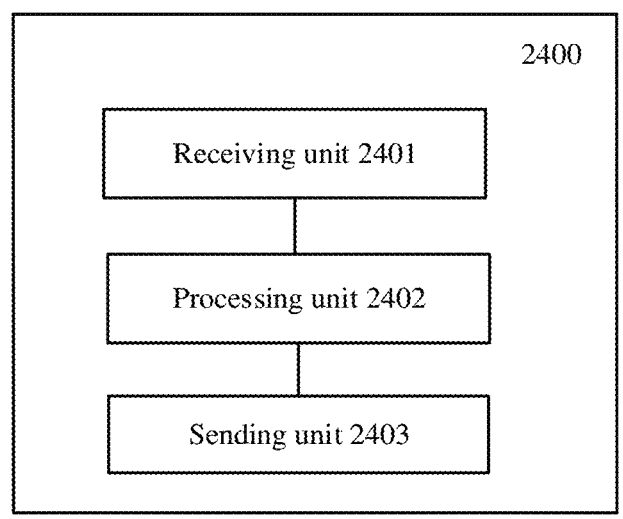
FIG. 24 is a schematic diagram of a structure of a communication apparatus according to some embodiments.

FIG. 24 is a schematic diagram of a structure of a communication apparatus according to some embodiments. As shown in FIG. 24, an apparatus 2400 includes a receiving unit 2401, a processing unit 2402, and a sending unit 2403. An implementation process is as follows.

The receiving unit 2401 is configured to receive a first packet from a second node, where the first packet includes an identifier of the second node, a first identifier, and an identifier of a receiving node.

The processing unit 2402 is configured to: determine, based on the first packet, whether a first node is the receiving node, and determine a first routing table based on the first packet in response to a determination being made that the first node is not the receiving node, where the first routing table is used for data routing to the receiving node.

The apparatus 2400 in some embodiments solves the following problem: In response to SL communication being unable to be implemented between UEs due to a hardware capability, a distance, external interference, or the like, a UE-to-UE forwarding system is introduced, that is, at least one forwarding UE is added between sending UE and receiving UE, to implement communication between the sending UE and the receiving UE. Further, a routing table for data transmission between the sending UE and forwarding UE, between forwarding UEs, and between the forwarding UE and the receiving UE is constructed to ensure working of the UE-to-UE forwarding system.

In an implementation, the processing unit 2402 is configured to determine the first routing table based on a routing table that is on the first node and that is for data routing with the receiving node.

The apparatus 2400 in some embodiments further solves the following problem: In response to determining that a forwarding node is not the final receiving node, the forwarding node queries, based on the identifier of the receiving node in the received packet, whether the forwarding node stores a routing table that is used for data routing with the receiving node. in response to the forwarding node storing the routing table that is used for data routing with the receiving node, the forwarding node does not call to further send a packet to construct the routing table that is used for data routing with the receiving node.

In an implementation, the sending unit 2403 is configured to send a third packet to another node in a multicast and/or broadcast manner, where the third packet includes the identifier of the receiving node.

The receiving unit 2401 is further configured to receive a fourth packet from a fourth node, where the fourth packet includes an identifier of the fourth node and an identifier of the first node, and a routing table for data routing with the receiving node exists on the fourth node, or the fourth node is the receiving node.

The processing unit 2402 is further configured to establish the first routing table based on the identifier of the fourth node.

The apparatus 2400 in some embodiments further solves the following problem: In response to the forwarding node finding that a routing table for data routing with the receiving node does not exist in the forwarding node, the forwarding node calls to further send a packet to find a node that routes data with the receiving node, and then construct a routing table by using a packet sent by the node that routes data with the receiving node, so that the forwarding node is configured to have the routing table for data routing with the receiving node.

In an implementation, in response to the routing table for data routing with the receiving node existing on the fourth node, the fourth packet further includes the identifier of the receiving node.

In an implementation, the sending unit 2403 is further configured to: in response to the first identifier being a destination broadcast identifier, send a second packet to the second node.

The apparatus 2400 in some embodiments further resolves the following problem: in response to a destination identifier in the packet received by the forwarding node being a broadcast identifier, a previous-hop node does not have a routing table that is used for data routing with the final receiving node. Therefore, the forwarding node calls to feed back information to the previous-hop node, so that the previous-hop node knows that the forwarding node has the routing table that is used for data routing with the final receiving node and a routing table is subsequently constructed between the previous hop and the node.

In an implementation, the second node is a forwarding node.

In an implementation, the first packet or the second packet further includes an identifier of a sending node.

The processing unit 2402 is further configured to determine a second routing table based on the first packet, where the second routing table is used for data routing to the sending node.

The apparatus 2400 in this application further resolves the following problem: The identifier of the sending node is included in the first packet or the second packet, therefore, the first node that receives the packet constructs, based on the identifier of the second node and the identifier of the sending node in the packet, a routing table for data routing to the second node.

In an implementation, the second routing table includes an initial identifier, a next-hop identifier, and the identifier of the sending node, where the initial identifier is an identifier of a node that is to send data, the next-hop identifier is an identifier of a node that receives the data, and the identifier of the sending node indicates that the data is finally sent to the sending node.

Figure 25:
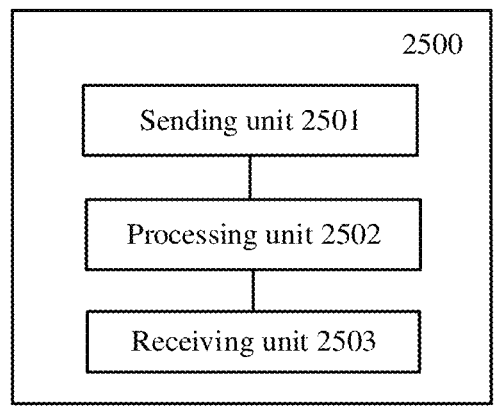
FIG. 25 is a schematic diagram of a structure of a communication apparatus according to some embodiments.

FIG. 25 is a schematic diagram of a structure of a communication apparatus according to some embodiments. As shown in FIG. 25, an apparatus 2500 includes a processing unit 2501, a sending unit 2502, and a receiving unit 2503. An implementation process is as follows.

The processing unit 2501 is configured to: determine that a first routing table does not exist, where the first routing table is used for data routing to a receiving node, and determine a first packet, where the first packet includes an identifier of a sending node, a destination broadcast/multicast identifier, and an identifier of the receiving node.

The sending unit 2502 is configured to send the first packet to a first node.

The receiving unit 2503 is configured to receive a second packet from the first node, where the second packet includes an identifier of the first node, the identifier of the sending node, and the identifier of the receiving node.

The processing unit 2501 is further configured to determine the first routing table based on the second packet.

The apparatus 2400 in this application solves the following problem: In response to performing SL communication, the sending node first queries whether the sending node has the routing table corresponding to the receiving node. in response to the sending node having the routing table corresponding to the receiving node, data is directly routed. in response to the sending node not having the routing table corresponding to the receiving node, a connection link for data routing with the receiving node is constructed by sending a packet, to facilitate subsequent data sending.

In an implementation, the processing unit 2501 is configured to determine, based on the identifier of the receiving node, that a routing table for data routing with the receiving node does not exist.

Figure 26:
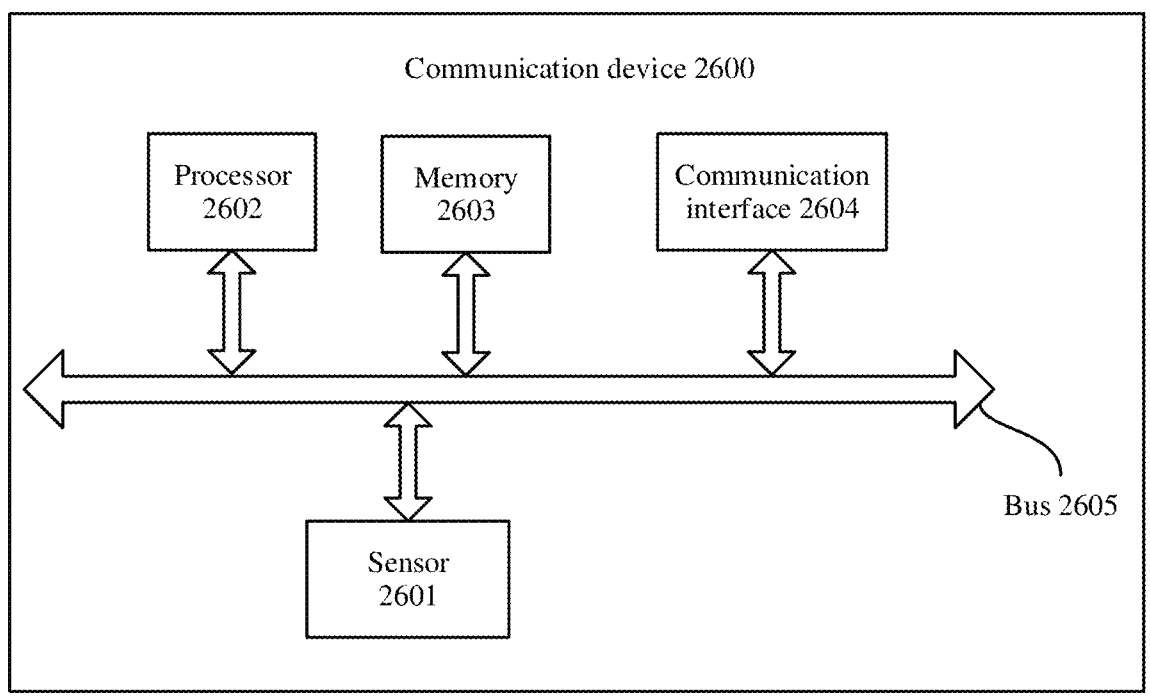
FIG. 26 is a schematic diagram of a structure of a communication device according to some embodiments.

FIG. 26 is a schematic diagram of a structure of a communication device according to some embodiments. A communication device 2600 is shown in FIG. 26. The communication device 2600 is any one of the sending UE, the forwarding UE, and the receiving UE, and includes a sensor 2601, a processor 2602, a memory 2603, a communication interface 2604, and a bus 2605. The processor 2602, the memory 2603, and the communication interface 2604 in the terminal device 2600 establishes a communication connection through the bus 2605.

The sensor 2601 is configured to send a packet and a data packet and receive a packet and a data packet.

The processor 2602 is a central processing unit (CPU). In the foregoing embodiments, operations such as parsing, constructing a routing table, searching for a routing table, and verifying an identifier performed by the sending UE, the forwarding UE, and the receiving UE after receiving a packet and/or a data packet are performed by the processor 2602.

The memory 2603 includes a volatile memory, such as a random-access memory (RAM); the memory 2603 includes a non-volatile memory, such as a read-only memory (ROM), a flash memory, a hard disk drive (HDD), or a solid-state drive (SSD); or the memory 2603 further includes a combination of the foregoing types of memories. Data such as a packet, a data packet, an identifier, and a routing table is stored in the memory 2603. In addition, the memory 2603 is further configured to store corresponding program instructions and the like that are executed by the processor 2604 to implement a secure startup method described in the foregoing embodiments.

Some embodiments provide a computer-readable storage medium, where the computer-readable storage medium stores a computer program, and in response to the computer program being executed on a computer, the computer is enabled to implement any one of the foregoing methods.

Some embodiments provide a computing device, including a memory and a processor, where the memory stores executable code, and in response to executing the executable code, the processor implements any one of the foregoing methods.

A person of ordinary skill in the art is aware that, in combination with the examples described in embodiments disclosed in the embodiments, units and algorithm steps are implemented by electronic hardware or a combination of computer software and electronic hardware. Whether the functions are performed by hardware or software depends on particular applications and design constraint conditions of the technical solutions. A person skilled in the art is able to use different methods to implement the described functions for each particular application, but implementation going beyond the scope of the embodiments deserves no consideration.

In addition, aspects or features in some embodiments are implemented as a method, an apparatus or a product that uses standard programming and/or engineering technologies. The term "product" used in some embodiments covers a computer program that is accessed from any computer-readable component, carrier or medium. For example, a computer-readable medium includes but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in the embodiments represents one or more devices and/or other machine-readable media that are configured to store information. The term "machine-readable media" includes but is not limited to a radio channel, and various other media that stores, contain and/or carry instructions and/or data.

In the foregoing embodiment, the non-contact interaction apparatus 900 shown in FIG. 9 is implemented in whole or in part by using software, hardware, firmware, or any combination thereof. In response to software being used to implement the apparatus, all or a part of the apparatus is implemented in a form of a computer program product. The computer program product includes one or more computer instructions. In response to the computer program instructions being loaded and executed on a computer, the procedures or functions according to some embodiments are all or partially generated. The computer is a general-purpose computer, a dedicated computer, a computer network, or other programmable apparatuses. The computer instructions are stored in a computer-readable storage medium or is transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible to a computer, or a data storage device integrating one or more usable media, for example, a server or a data center. The usable medium is a magnetic medium (for example, a floppy disk, a hard disk, or a magnetic tape), an optical medium (for example, DVD), a semiconductor medium (for example, a solid-state drive Solid State Disk (SSD)), or the like.

In some embodiments, sequence numbers of the foregoing processes do not mean execution sequences in various embodiments. The execution sequences of the processes are determined according to functions and internal logic of the processes, and are unable to be construed as any limitation on the implementation processes of some embodiments.

A person skilled in the art clearly understands that, for the purpose of convenient and brief description, for a detailed working process of the foregoing system, apparatus, and unit, refer to a corresponding process in the foregoing method embodiments. Details are not described herein again.

In some embodiments, the disclosed system, apparatus, and method is implemented in other manners. For example, the described apparatus embodiment is an example. For example, division into the units is logical function division. There is another division manner in implementation. For example, a plurality of units or components are combined or integrated into another system, or some features are ignored or not performed. In addition, the displayed or discussed mutual couplings or direct couplings or communication connections are implemented through some interfaces. The indirect couplings or communication connections between the apparatuses or units are implemented in electrical, mechanical, or another form.

The units described as separate components are or are unable to be physically separate, and components displayed as units are or are unable to be physical units, is located in one place, or is distributed on a plurality of network units. A part or all of the units are selected based on conditions to achieve the objectives of the solutions of embodiments.

In response to the functions being implemented in the form of a software functional unit and sold or used as an independent product, the functions are stored in a computer-readable storage medium. Based on such an understanding, the technical solutions of some embodiments essentially, or the part contributing to the current technology, or a part of the technical solutions are implemented in a form of a software product. The computer software product is stored in a storage medium, and includes several instructions for instructing a computer device (which is a personal computer, a server, or an access network device) to perform all or a part of the steps of the methods described in some embodiments. The foregoing storage medium includes any medium that stores program code, such as a USB flash drive, a removable hard disk, a read-only memory (ROM), a random access memory (RAM), a magnetic disk, or an optical disc.

The foregoing descriptions are implementations of the embodiments, but are not intended to limit the protection scope of the embodiments. Any variation or replacement readily figured out by a person skilled in the art within the technical scope disclosed in the embodiments shall fall within the protection scope of the embodiments.

The invention claimed is:

1. A communication apparatus, comprises:
   a processor; and
   a memory, configured to store a computer program, the processor is configured to execute the computer program stored in the memory, to cause the processor to:
   receive a first data packet sent by a previous-hop forwarding node or a first sending node, wherein:
      the first data packet includes a first initial identifier, a first next-hop identifier, and an identifier of a first receiving node;
      the first initial identifier includes an identifier of the previous-hop forwarding node or an identifier of the first sending node;
      the first next-hop identifier includes a first identifier; and
      the identifier of the first receiving node is usable to detect whether a forwarding node stores the identifier of the first receiving node, wherein the forwarding node:
         is configured to forward data between at least one sending node and at least one receiving node;
         stores the first identifier and a second identifier;
         the first identifier and the second identifier are useable to establish sidelink (SL) communication for the first sending node and the first receiving node; and
         there is a mapping relationship between the first identifier and the second identifier;
   determine, at a backhaul adaptation protocol (BAP) layer, an identifier of a next-hop node obtained by the forwarding node by searching for, based on an identifier to which the first next-hop identifier is mapped, a routing table that is associated with the identifier to which the first next-hop identifier is mapped;
   obtain the identifier of the next-hop node from the routing table; and
   forward the first data packet to a node corresponding to the identifier of the next-hop node, wherein at a media access control (MAC) layer in the forwarding node;
   the first initial identifier in the first data packet is set to the second identifier; and
   the first next-hop identifier in the first data packet is set to the identifier of the next-hop node.

2. The apparatus according to claim 1, wherein the computer program, in response to being executed by the processor, further causes the processor to:
   before the determining, at the BAP layer, the identifier of the next-hop node, determine whether the identifier of the first receiving node does not exist at the BAP layer.

3. The apparatus according to claim 1, wherein the computer program, in response to being executed by the processor, further causes the processor to:
   in response to the forwarding node including one receiving BAP layer and one sending BAP layer, and the receiving BAP layer or the sending BAP layer is shared by SL connections, the determining, at the BAP layer, the identifier of the next-hop node comprises:
      in response to receiving the first data packet, determine, by the receiving BAP layer based on the identifier of the first receiving node in the first data packet, whether the identifier of the first receiving node is stored;
   response to determining that the identifier of the first receiving node does not exist, send, by the receiving BAP layer, the first data packet to the sending BAP layer;

determine, by the sending BAP layer, the identifier of the next-hop node based on the first initial identifier in the first data packet; and
forward the first data packet to a bearer for the SL communication that is established between the first sending node and the first receiving node.

4. The apparatus according to claim 1, wherein the computer program, in response to being executed by the processor, further causes the processor to:
in response to the forwarding node including one BAP layer, and the BAP layer is shared by SL connections, the determining, at the BAP layer, the identifier of the next-hop node comprises:
in response to receiving the first data packet, determine, by the BAP layer based on the identifier of the first receiving node in the first data packet, whether the identifier of the first receiving node is stored;
in response to determining that the identifier of the first receiving node does not exist, determine, by the BAP layer, the identifier of the next-hop node based on the first initial identifier in the first data packet; and
forward the first data packet to a bearer for the SL communication that is established between the first sending node and the first receiving node.

5. The apparatus according to claim 1, wherein the computer program, in response to being executed by the processor, further causes the processor to:
in response to the forwarding node including at least two receiving BAP layers and at least two sending BAP layers, each receiving BAP layer and each sending BAP layer correspond to one SL connection, and each SL connection corresponds to one SL bearer, the determining, at the BAP layer, the identifier of the next-hop node comprises:
in response to receiving the first data packet by using an SL bearer corresponding to a first receiving BAP layer, determine, by the first receiving BAP layer based on the identifier of the first receiving node in the first data packet, whether the identifier of the first receiving node is stored;
in response to determining that the identifier of the first receiving node does not exist, send, by the first receiving BAP layer, the first data packet to a first sending BAP layer;
determine, by the first sending BAP layer, the identifier of the next-hop node based on the first initial identifier in the first data packet; and
forward the first data packet to an SL bearer corresponding to the first sending BAP layer, wherein the first receiving BAP layer and the first sending BAP layer perform data routing for an SL established by the first sending node and the first receiving node.

6. The apparatus according to claim 1, wherein the computer program, in response to being executed by the processor, further causes the processor to:
in response to the forwarding node including at least two BAP layers, each BAP layer corresponds to one SL connection, and each SL connection corresponds to at least two SL bearers, the determining, at the BAP layer, the identifier of the next-hop node comprises:
in response to receiving the first data packet by using a first SL bearer corresponding to a first BAP layer, determine, by the first BAP layer based on the identifier of the first receiving node in the first data packet, whether the identifier of the first receiving node is stored;
in response to determining that the identifier of the first receiving node does not exist, determine, by the first BAP layer, the identifier of the next-hop node based on the first initial identifier in the first data packet; and
forward the first data packet to a second SL bearer corresponding to the first BAP layer, wherein the first BAP layer performs data routing for an SL established by the first sending node and the first receiving node, the first SL bearer is usable to receive the first data packet, and the second SL bearer is usable to send a second data packet.

7. A communication apparatus, comprises:
a processor; and
a memory, configured to store a computer program that in response to being executed by the processor, cause the processor to:
receive a first data packet sent by a previous-hop forwarding node or a first sending node, wherein the first data packet includes:
a first initial identifier that includes an identifier of the previous-hop forwarding node or an identifier of the first sending node;
a first next-hop identifier that includes a first identifier;
a backhaul adaptation protocol (BAP) identifier; and
an identifier of a receiving node and is useable to detect whether a forwarding node stores the identifier of the receiving node, wherein the forwarding node:
is configured to forward data between at least one sending node and at least one receiving node; and
stores the first identifier useable to establish sidelink (SL) communication between the at least one sending node and the at least one receiving node;
determine, based on the first initial identifier and the first next-hop identifier, a quantity of receiving nodes that can receive a data packet sent by the previous-hop forwarding node or the first sending node;
in response to there being at least two receiving nodes, search for, by a BAP layer in the forwarding node based on the first next-hop identifier and the identifier of the receiving node, a routing table that is associated with the first next-hop identifier and with the identifier of the receiving node; and
obtain an identifier of a next-hop node from the routing table.

8. The apparatus according to claim 7, wherein the computer program that in response to being executed by the processor, further cause the processor to:
forward the first data packet to a node corresponding to the identifier of the next-hop node, wherein at a media access control (MAC) layer:
the first initial identifier in the first data packet is indicated to be set to the first identifier; and
the first next-hop identifier in the first data packet is indicated to be set to the identifier of the next-hop node.

9. The apparatus according to claim 7, wherein the computer program that in response to being executed by the processor, further cause the processor to:
in response to a determination that there is one receiving node, forward the first data packet to a next-hop forwarding node or the receiving node, wherein at a MAC layer in the forwarding node;

the first initial identifier in the first data packet is set to the first identifier; and the first next-hop identifier in the first data packet is set to the identifier of the next-hop node or the identifier of the receiving node.

10. A communication apparatus, comprises:

a processor; and a memory, configured to store a computer program, that in response to being executed by the processor cause the processor to:
- receive a first data packet sent by a previous-hop forwarding node or a first sending node, wherein the first data packet includes:
  - a first initial identifier that is an identifier of the previous-hop forwarding node or an identifier of the first sending node;
  - a first next-hop identifier that is a first identifier;
  - a first source identifier that is the identifier of the first sending node and indicates a corresponding packet data convergence protocol (PDCP) layer in a receiving node to receive the first data packet; and
  - an identifier of the receiving node is usable to detect whether a forwarding node stores the identifier of the receiving node, wherein the forwarding node:
    - is configured to forward data between at least one sending node and at least one receiving node; and
    - stores the first identifier usable to establish sidelink (SL) communication between the at least one sending node and the at least one receiving node;
- determine, at a backhaul adaptation protocol (BAP) layer, an identifier of a next-hop node, wherein the identifier of the next-hop node is obtained by the forwarding node by searching for, based on the first next-hop identifier and the identifier of the receiving node, a routing table that is associated with the first next-hop identifier and with the identifier of the receiving node;
- obtain the identifier of the next-hop node from the routing table; and
- forward the first data packet to a node corresponding to the identifier of the next-hop node, wherein at a media access control (MAC) layer in the forwarding node;
  - the first initial identifier in the first data packet is set to the first identifier; and
  - the first next-hop identifier in the first data packet is set to the identifier of the next-hop node.

11. A communication method, comprising:

receiving a first data packet sent by a previous-hop forwarding node or a first sending node, wherein:

the first data packet includes a first initial identifier, a first next-hop identifier, and an identifier of a first receiving node;

the first initial identifier includes an identifier of the previous-hop forwarding node or an identifier of the first sending node;

the first next-hop identifier includes a first identifier; and the identifier of the first receiving node is usable to detect whether a forwarding node stores the identifier of the first receiving node, wherein the forwarding node:
- is configured to forward data between at least one sending node and at least one receiving node;
- stores the first identifier and a second identifier;

the first identifier and the second identifier are useable to establish sidelink (SL) communication for the first sending node and the first receiving node; and there is a mapping relationship between the first identifier and the second identifier;

determining, at a backhaul adaptation protocol (BAP) layer, an identifier of a next-hop node, wherein the identifier of the next-hop node is obtained by the forwarding node by searching for, based on an identifier to which the first next-hop identifier is mapped, a routing table that is associated with the identifier to which the first next-hop identifier is mapped;

obtaining the identifier of the next-hop node from the routing table; and forwarding the first data packet to a node corresponding to the identifier of the next-hop node, wherein at a media access control (MAC) layer in the forwarding node:
- the first initial identifier in the first data packet is set to the second identifier; and
- the first next-hop identifier in the first data packet is set to the identifier of the next-hop node.

12. The method according to claim 11, further comprising:

before the determining, at the BAP layer, the identifier of the next-hop node, determining whether the identifier of the first receiving node does not exist at the BAP layer.

13. The method according to claim 11, further comprising:

in response to the forwarding node including one receiving BAP layer and one sending BAP layer, and the receiving BAP layer or the sending BAP layer is shared by SL connections, the determining, at the BAP layer, the identifier of the next-hop node comprises:
- in response to receiving the first data packet, determining, by the receiving BAP layer based on the identifier of the first receiving node in the first data packet, whether the identifier of the first receiving node is stored;
- in response to determining that the identifier of the first receiving node does not exist, sending, by the receiving BAP layer, the first data packet to the sending BAP layer;
- determining, by the sending BAP layer, the identifier of the next-hop node based on the first initial identifier in the first data packet; and
- forwarding the first data packet to a bearer for the SL communication that is established between the first sending node and the first receiving node.

14. The method according to claim 11, further comprising:

in response to the forwarding node including one BAP layer, and the BAP layer is shared by SL connections, the determining, at the BAP layer, the identifier of the next-hop node comprises:
- in response to receiving the first data packet, determining, by the BAP layer based on the identifier of the first receiving node in the first data packet, whether the identifier of the first receiving node is stored;
- in response to determining that the identifier of the first receiving node does not exist, determining, by the BAP layer, the identifier of the next-hop node based on the first initial identifier in the first data packet; and forwarding the first data packet to a bearer for the SL communication that is established between the first sending node and the first receiving node.

15. The method according to claim 11, further comprising:
in response to the forwarding node including at least two receiving BAP layers and at least two sending BAP layers, each receiving BAP layer and each sending BAP layer correspond to one SL connection, and each SL connection corresponds to one SL bearer, the determining, at the BAP layer, the identifier of the next-hop node comprises:
in response to receiving the first data packet by using an SL bearer corresponding to a first receiving BAP layer, determining, by the first receiving BAP layer based on the identifier of the first receiving node in the first data packet, whether the identifier of the first receiving node is stored;
in response to determining that the identifier of the first receiving node does not exist, sending, by the first receiving BAP layer, the first data packet to a first sending BAP layer;
determining, by the first sending BAP layer, the identifier of the next-hop node based on the first initial identifier in the first data packet; and
forwarding the first data packet to an SL bearer corresponding to the first sending BAP layer, wherein the first receiving BAP layer and the first sending BAP layer perform data routing for an SL established by the first sending node and the first receiving node.

16. The method according to claim 11, further comprising:
in response to the forwarding node including at least two BAP layers, each BAP layer corresponds to one SL connection, and each SL connection corresponds to at least two SL bearers, the determining, at the BAP layer, the identifier of the next-hop node comprises:
in response to receiving the first data packet by using a first SL bearer corresponding to a first BAP layer, determining, by the first BAP layer based on the identifier of the first receiving node in the first data packet, whether the identifier of the first receiving node is stored;
in response to determining that the identifier of the first receiving node does not exist, determining, by the first BAP layer, the identifier of the next-hop node based on the first initial identifier in the first data packet; and
forwarding the first data packet to a second SL bearer corresponding to the first BAP layer, wherein the first BAP layer performs data routing for an SL established by the first sending node and the first receiving node, the first SL bearer is usable to receive the first data packet, and the second SL bearer is usable to send a second data packet.

17. A non-transitory computer readable medium having a computer program stored thereon that, in response to being executed by a processor, cause the processor to:
receive a first data packet sent by a previous-hop forwarding node or a first sending node, wherein:
the first data packet includes a first initial identifier, a first next-hop identifier, and an identifier of a first receiving node;
the first initial identifier includes an identifier of the previous-hop forwarding node or an identifier of the first sending node;
the first next-hop identifier includes a first identifier; and
the identifier of the first receiving node is usable to detect whether a forwarding node stores the identifier of the first receiving node, wherein the forwarding node:
is configured to forward data between at least one sending node and at least one receiving node;
stores the first identifier and a second identifier;
the first identifier and the second identifier are useable to establish sidelink (SL) communication for the first sending node and the first receiving node; and
there is a mapping relationship between the first identifier and the second identifier;
determine, at a backhaul adaptation protocol (BAP) layer, an identifier of a next-hop node, wherein the identifier of the next-hop node is obtained by the forwarding node by searching for, based on an identifier to which the first next-hop identifier is mapped, a routing table that is associated with the identifier to which the first next-hop identifier is mapped;
obtain the identifier of the next-hop node from the routing table; and
forward the first data packet to a node corresponding to the identifier of the next-hop node, wherein at a media access control (MAC) layer in the forwarding node:
the first initial identifier in the first data packet is set to the second identifier; and
the first next-hop identifier in the first data packet is set to the identifier of the next-hop node.

18. The non-transitory computer readable medium according to claim 17, wherein the computer program, in response to being executed by the processor, cause the processor to:
before the determining, at the BAP layer, the identifier of the next-hop node, determine whether the identifier of the first receiving node does not exist at the BAP layer.

19. The non-transitory computer readable medium according to claim 17, wherein the computer program, in response to being executed by the processor, cause the processor to:
in response to the forwarding node including one receiving BAP layer and one sending BAP layer, and the receiving BAP layer or the sending BAP layer is shared by SL connections, the determining, at the BAP layer, the identifier of the next-hop node comprises:
in response to receiving the first data packet, determine, by the receiving BAP layer based on the identifier of the first receiving node in the first data packet, whether the identifier of the first receiving node is stored;
in response to determining that the identifier of the first receiving node does not exist, send, by the receiving BAP layer, the first data packet to the sending BAP layer;
determine, by the sending BAP layer, the identifier of the next-hop node based on the first initial identifier in the first data packet; and
forward the first data packet to a bearer for the SL communication that is established between the first sending node and the first receiving node.

20. The non-transitory computer readable medium according to claim 17, wherein the computer program, in response to being executed by the processor, cause the processor to:

in response to the forwarding node including one BAP layer, and the BAP layer is shared by SL connections, the determining, at the BAP layer, the identifier of the next-hop node comprises:

in response to receiving the first data packet, determine, by the BAP layer based on the identifier of the first receiving node in the first data packet, whether the identifier of the first receiving node is stored;

in response to determining that the identifier of the first receiving node does not exist, determine, by the BAP layer, the identifier of the next-hop node based on the first initial identifier in the first data packet; and forward the first data packet to a bearer for the SL communication that is established between the first sending node and the first receiving node.

* * * * *